(12) United States Patent
Bennis

(10) Patent No.: US 7,797,877 B1
(45) Date of Patent: Sep. 21, 2010

(54) FIXED AND SLIP FISHING APPARATUS FOR BOBBERS

(76) Inventor: Gary Bennis, 630 Lamplighter Ct., Eau Claire, WI (US) 54703

( * ) Notice: Subject to any disclaimer, the term of this patent is extended or adjusted under 35 U.S.C. 154(b) by 0 days.

(21) Appl. No.: 12/336,696

(22) Filed: Dec. 17, 2008

Related U.S. Application Data

(63) Continuation-in-part of application No. 11/707,251, filed on Feb. 15, 2007.

(51) Int. Cl.
*A01K 93/00* (2006.01)
*A01K 91/03* (2006.01)

(52) U.S. Cl. .................. 43/44.87; 43/44.86; 43/44.9; 43/44.93; 43/44.94; 43/44.95

(58) Field of Classification Search ............ 43/44.87, 43/44.9, 44.94, 44.95, 44.92, 43.1, 42.49, 43/44.86, 44.93, 44.91; 24/581.1, 136 R; 403/309, 315
See application file for complete search history.

(56) References Cited

U.S. PATENT DOCUMENTS

| | | | | | |
|---|---|---|---|---|---|
| 261,505 | A | * | 7/1882 | Wilson | 43/43.1 |
| 332,573 | A | * | 12/1885 | Tufts | 43/44.91 |
| 862,853 | A | * | 8/1907 | Simmons | 43/44.91 |
| 1,418,944 | A | * | 6/1922 | Lower | 43/44.95 |
| 1,457,550 | A | * | 6/1923 | Runkel | 43/44.95 |
| 2,004,414 | A | * | 6/1935 | Menefee | 43/43.1 |
| 2,163,483 | A | * | 6/1939 | Carlisle | 43/44.95 |
| 2,181,458 | A | * | 11/1939 | La Gue | 43/44.87 |
| 2,209,638 | A | * | 7/1940 | Smith | 24/136 R |
| 2,221,168 | A | * | 11/1940 | Pflueger | 43/43.1 |
| 2,239,813 | A | * | 4/1941 | Dubell | 43/44.9 |
| 2,305,234 | A | * | 12/1942 | Bratz | 43/44.86 |
| 2,316,074 | A | * | 4/1943 | Kimbrough | 43/44.9 |
| 2,435,730 | A | * | 2/1948 | Worden | 43/44.93 |

(Continued)

FOREIGN PATENT DOCUMENTS

EP 459053 A1 * 12/1991

(Continued)

*Primary Examiner*—Darren W Ark
(74) *Attorney, Agent, or Firm*—McNeely & Hare LLP; William D. Hare

(57) ABSTRACT

The invention relates to a fishing tackle stem guide for use in fishing in multiple seasons. The stem guide includes an elongated rod, at least one sleeve stop, a stem connector and a line stop. The elongated rod includes at least one line shoulder therein extending from an outer surface of the elongated rod to within the elongated rod for receiving a fishing line. The at least one sleeve stop limits the movement of a sleeve in a lengthwise direction of the elongated rod. The stem connector is located on a first end of the elongated rod. The line stop system includes a movable sleeve positioned on the elongated rod and is located on a second end of the elongated rod for fixing a position of the fishing line in a first line shoulder relative to the elongated rod in a first position to enable the fishing line to be restrained from sliding along the line shoulder and for positioning the fishing line in a second line shoulder in a second position to enable the fishing line to be slidable along the line shoulder. The sleeve stop is positioned between the first position and the second position to prevent the movable sleeve from sliding over the entirety of the line shoulder in the second position.

25 Claims, 20 Drawing Sheets

U.S. PATENT DOCUMENTS

| | | | | |
|---|---|---|---|---|
| 2,482,625 A * | 9/1949 | Kunkel | ............... | 24/136 R |
| 2,501,471 A * | 3/1950 | Larson | ............... | 43/44.87 |
| 2,587,311 A * | 2/1952 | Golnick | ............... | 43/44.87 |
| 2,720,720 A * | 10/1955 | Landrum | ............... | 43/44.91 |
| 2,755,589 A * | 7/1956 | Osborne | ............... | 43/44.9 |
| 2,807,907 A * | 10/1957 | Brite | ............... | 43/44.91 |
| 2,867,936 A * | 1/1959 | Lambach | ............... | 43/44.95 |
| 2,869,278 A * | 1/1959 | Cook | ............... | 43/44.86 |
| 2,910,798 A * | 11/1959 | Bias | ............... | 43/44.9 |
| 2,957,266 A * | 10/1960 | Pfister | ............... | 43/44.91 |
| 3,023,535 A * | 3/1962 | Holka et al. | ............... | 43/44.86 |
| 3,023,538 A * | 3/1962 | Cameron | ............... | 43/44.95 |
| 3,168,790 A * | 2/1965 | Creasey | ............... | 43/44.9 |
| 3,184,880 A * | 5/1965 | Ratte | ............... | 43/44.86 |
| 3,323,247 A * | 6/1967 | Murray | ............... | 43/44.95 |
| 3,613,289 A * | 10/1971 | Wehren | ............... | 43/44.9 |
| 3,624,949 A * | 12/1971 | Lowndes | ............... | 43/44.91 |
| 3,667,149 A * | 6/1972 | Daigle | ............... | 43/44.91 |
| 3,800,459 A * | 4/1974 | Fleischaker | ............... | 43/44.9 |
| 3,866,346 A * | 2/1975 | Schneider | ............... | 43/44.94 |
| 3,918,193 A * | 11/1975 | Schneider | ............... | 43/44.94 |
| 4,177,598 A * | 12/1979 | Jolley | ............... | 43/44.95 |
| 4,361,977 A * | 12/1982 | Lawler | ............... | 43/44.95 |
| 4,449,318 A * | 5/1984 | Lane | ............... | 43/44.9 |
| 4,506,471 A * | 3/1985 | Riead | ............... | 43/44.87 |
| 4,574,515 A * | 3/1986 | Garner | ............... | 43/44.95 |
| 4,693,030 A * | 9/1987 | Wohead | ............... | 43/43.1 |
| 4,757,635 A * | 7/1988 | Cole | ............... | 43/44.91 |
| 4,986,023 A * | 1/1991 | Bucholz | ............... | 43/44.9 |
| 5,235,777 A * | 8/1993 | Burns | ............... | 43/44.91 |
| 5,241,774 A * | 9/1993 | Rayburn | ............... | 43/44.92 |
| 5,243,780 A * | 9/1993 | Christensen | ............... | 43/44.95 |
| 5,329,722 A * | 7/1994 | Wilson | ............... | 43/44.94 |
| 5,359,804 A * | 11/1994 | Burns | ............... | 43/44.91 |
| 5,373,659 A * | 12/1994 | Neese, Jr. | ............... | 43/44.94 |
| 5,404,668 A * | 4/1995 | Christensen | ............... | 43/44.87 |
| 5,490,348 A * | 2/1996 | Serba | ............... | 43/44.91 |
| 5,608,985 A * | 3/1997 | Kainec | ............... | 43/44.95 |
| 5,737,868 A * | 4/1998 | Rikard | ............... | 43/44.92 |
| 5,987,807 A * | 11/1999 | Reed | ............... | 43/44.95 |
| 6,158,164 A * | 12/2000 | Mack et al. | ............... | 43/44.95 |
| 6,173,524 B1 * | 1/2001 | Kinchen, Sr. | ............... | 43/44.95 |
| 6,425,200 B1 * | 7/2002 | Bennis | ............... | 43/44.91 |
| 6,493,981 B2 * | 12/2002 | Izzard | ............... | 43/44.9 |
| 6,880,288 B1 * | 4/2005 | Hanes | ............... | 43/44.92 |
| 7,082,711 B2 * | 8/2006 | Adams | ............... | 43/17.5 |
| 7,100,323 B1 * | 9/2006 | Bogess | ............... | 43/44.87 |
| 7,434,349 B2 * | 10/2008 | Bennis | ............... | 43/44.9 |
| 7,437,851 B2 * | 10/2008 | Bennis | ............... | 43/44.91 |
| 2006/0254121 A1 * | 11/2006 | Huynh | ............... | 43/44.95 |
| 2006/0288633 A1 * | 12/2006 | Fiferlick | ............... | 43/44.92 |
| 2007/0227058 A1 * | 10/2007 | Adams | ............... | 43/44.95 |

FOREIGN PATENT DOCUMENTS

| | | | |
|---|---|---|---|
| EP | 624314 A2 * | 11/1994 | |
| FR | 2688656 A1 * | 9/1993 | |
| GB | 2155292 A * | 9/1985 | |
| GB | 2203622 A * | 10/1988 | |
| GB | 2232864 A * | 1/1991 | |
| GB | 2240698 A * | 8/1991 | |
| GB | 2263851 A * | 8/1993 | |
| GB | 2305344 A * | 4/1997 | |
| GB | 2330756 A * | 5/1999 | |
| GB | 2345425 A * | 7/2000 | |
| GB | 2400006 A * | 10/2004 | |
| GB | 2411560 A * | 9/2005 | |
| JP | 01235531 A * | 9/1989 | |
| JP | 10028501 A * | 2/1998 | |
| JP | 11056186 A * | 3/1999 | |
| JP | 11196734 A * | 7/1999 | |
| JP | 2000125731 A * | 5/2000 | |
| JP | 2002027881 A * | 1/2002 | |
| JP | 2002325532 A * | 11/2002 | |
| JP | 2002325533 A * | 11/2002 | |
| JP | 2003079296 A * | 3/2003 | |
| JP | 2003092961 A * | 4/2003 | |
| JP | 2004049076 A * | 2/2004 | |
| JP | 2004201670 A * | 7/2004 | |
| JP | 2005080614 A * | 3/2005 | |
| JP | 2005124425 A * | 5/2005 | |
| JP | 2005160460 A * | 6/2005 | |
| WO | WO 9902031 A1 * | 1/1999 | |

* cited by examiner

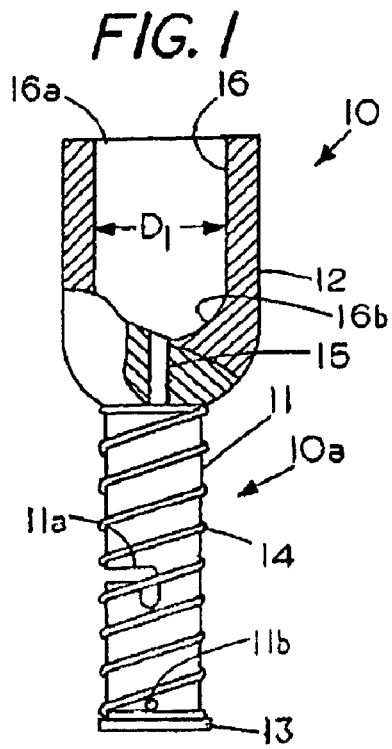
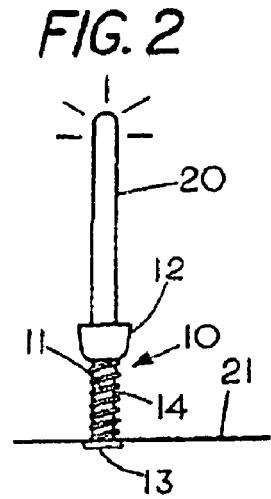
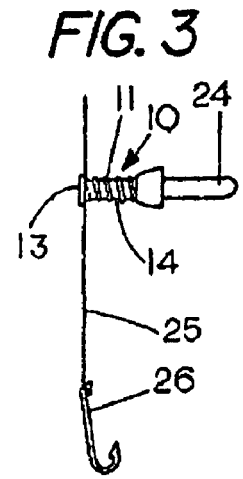
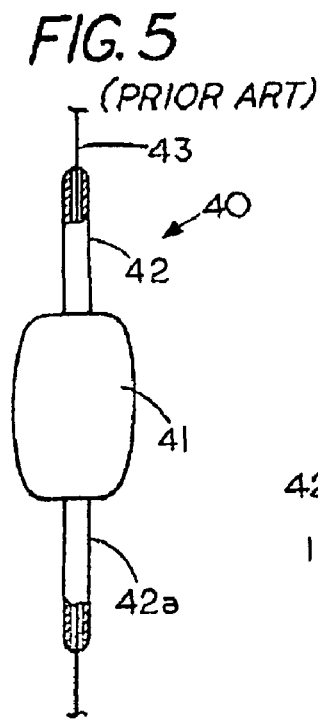
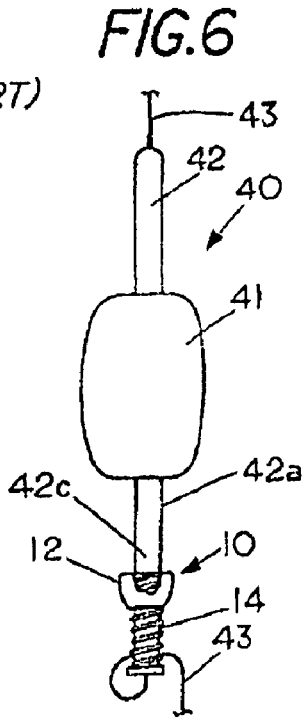
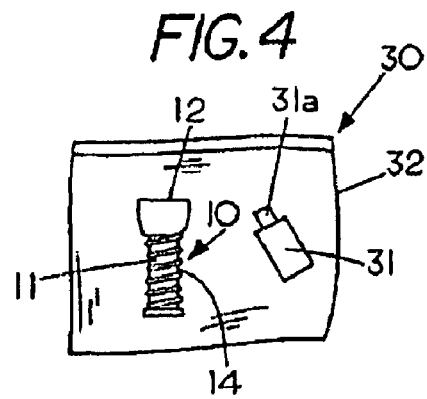
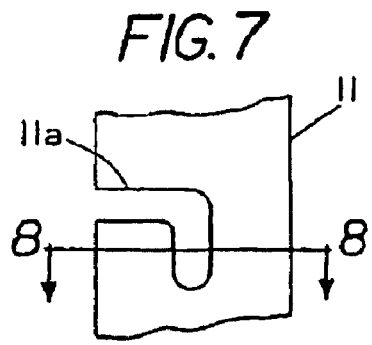
FIG. 5 (PRIOR ART)

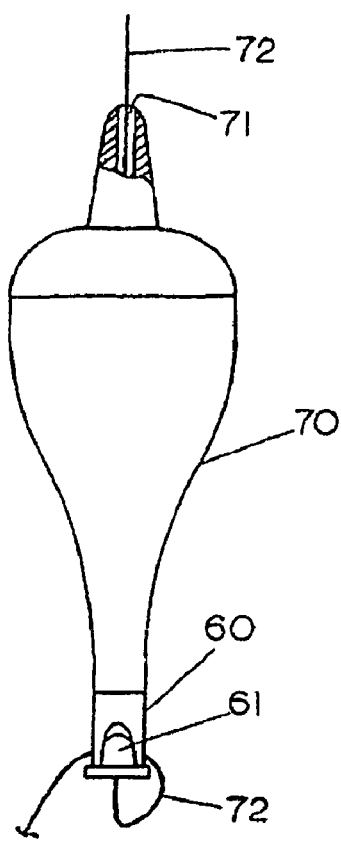
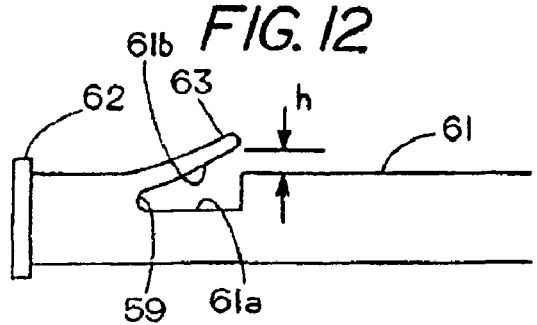
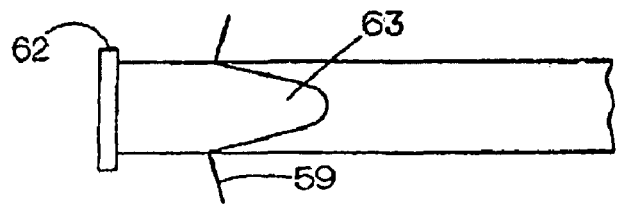
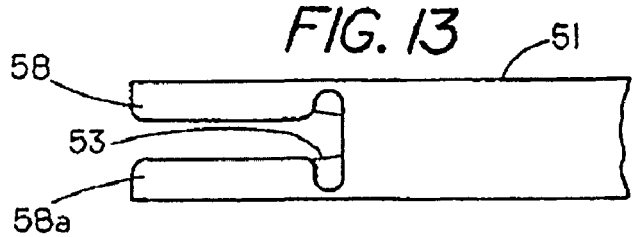
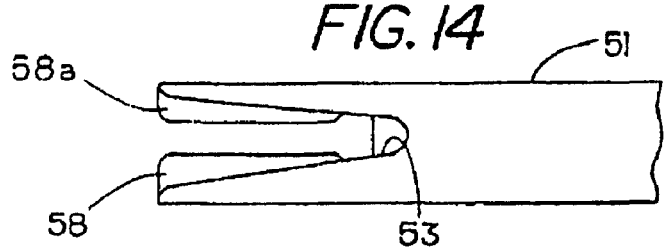
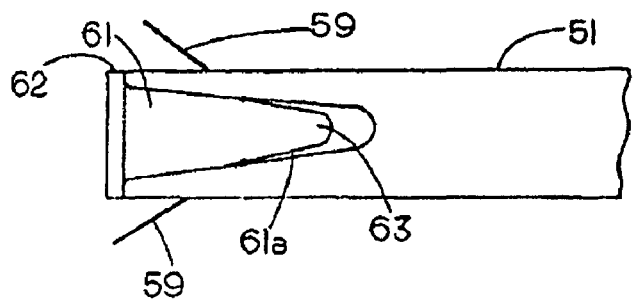

SECTION A-A

FIXED AND SLIP FISHING APPARATUS FOR BOBBERS

CROSS REFERENCE TO RELATED APPLICATIONS

This application claims priority under 35 USC §120 as a continuation-in-part of U.S. patent application Ser. No. 11/707,251 filed on Feb. 15, 2007, the contents of which are incorporated herein in their entirety by reference.

FIELD OF THE INVENTION

This invention relates generally to fishing gear and, specifically, to a fishing tackle stem guide for temporarily securing a fishing line to various types of fishing tackle to enable the user to easily attach or remove the fishing line from the various types of fishing tackle. More specifically, the invention relates to a fishing tackle stem guide for temporarily securing a fishing line to various types of fishing tackle to allow the line to slide relative to the fishing tackle during winter fishing conditions as well as be fixed for fixed fishing.

BACKGROUND OF THE INVENTION

The concept of fishing tackle such as fishing bobbers that can be used either as a slip bobber or a fixed line bobber is known in the art. Typically, in the slip bobber mode the fishing line extends freely through a tube in the fishing float. A string stop in the form of a knot is tied onto the fishing line. Usually a bead, which can slide along the fishing line, is placed on the fishing line with the knot forming a stop for the bead and the bead having a larger outside diameter than the tube to form a stop for the fishing bobber. The knot being small can pass through the eyes of the fishing rod and the fishing reel to allow the line with the knot to be wound up on the fishing reel. As one casts the line with the slip bobber and the bead the hook with the bait sinks allowing the fishing line to slide through the slip bobber until the bead engages the knot, which prevents further sliding of the bead along the fishing line. In addition, since the bead cannot pass through the tube in the fishing float it also stops the fishing float from sliding past the knot thus limiting the depth of the hook.

The slip bobbers, which are well known in the art, are also often used to fish in a fixed line mode, that is, the bobber is temporarily attached to the fishing line with a spring clamp that slides over a fishing line that extends through a saw cut on the hollow stem in the fishing float. Unfortunately, the fishing float stems with saw cuts in the hollow stem have sharp edges which can weaken and cut the soft flexible fishing lines. In addition to harshness to the fishing line by the saw cut in the stem of a fishing float the placement of a saw cut in the stem of the fishing bobber weakens the stem, which can cause the stem to break during use. One such fishing float with a spring and saw cut hollow stem is shown in U.S. Pat. No. 7,082,711. Another such fishing float with a saw cut stem is sold by Carlson Tackle Company Inc. of Cortland, Ohio under the trademark Wing-it™.

An improved line stop is found in a fishing bobber sold under the name Lucky Jack™ by ROD-N-BOBB'S of Eau Claire, Wis. The improved line stop includes a compression spring located around a hollow stem, which is an integral portion of the fixed/slip bobber. The line guide shoulders in the stem of the bobber include rounded or radiused corners to protect the fishing line from nicks and cuts that would weaken the fishing line thus causing the line to break unexpectedly. While the improved line stop is useful as part of a slip bobber it has limited application to slip bobbers.

Although the improved line stop can protect the fishing line from abrasion the spring forms a moving part that can become stuck. In order to avoid a spring that can stick it would be desired to have a line stop for use on fishing tackle that has no moving parts and can be used on slip bobbers as well as other types of fishing tackle.

Oftentimes a fisher person may want to create his or her own tackle, such as a line light or a scent stick that can be quickly attached or detached from a fishing line. Unfortunately, devices for attaching a fishing line to a piece of tackle include extraneous items that render it impractical to use the device, consequently, people who use line lights or scent sticks attach the devices to a fishing line using a rubber band or the like.

The present invention provides improved fishing tackle that eliminates the use of jerry rigging with rubber bands as well as minimizes the opportunity for the fishing line to be weakened by the line stops on the fishing floats.

SUMMARY OF THE INVENTION

In one general aspect, a fishing tackle stem guide has an elongated rod having a line shoulder therein with a stem connector located on a first end of the elongated rod and a line stop located on the opposite end of the stem guide to enable a fishing line to be restrained from sliding along the line shoulder with the fishing tackle stem guide also available in kit form to enable a person to attach fishing tackle to a fishing line while on-the-go. In one embodiment the fishing tackle stem guide uses a spring as part of the line stop and in yet another embodiment the line stop eliminate the use of a spring to secure the line thereto. While the fishing tackle stem guide without springs is an after-market item it can also be integrally formed to existing devices if desired.

In another general aspect, a fishing tackle stem guide includes an elongated rod, at least one sleeve stop, a stem connector and a line stop. The stem guide may be configured for use in fishing in multiple seasons. The elongated rod includes a hollow portion for receiving a fishing line and at least one line shoulder therein for receiving a fishing line, the line shoulder extending from an outer surface of the elongated rod to within the elongated rod. The at least one sleeve stop limits the movement of a sleeve in a lengthwise direction of the elongated rod. The stem connector is located on a first end of the elongated rod. The line stop system includes a movable sleeve positioned on the elongated rod and is located on a second end of the elongated rod for fixing a position of the fishing line in a first line shoulder relative to the elongated rod in a first position to enable the fishing line to be restrained from sliding along the line shoulder and for positioning the fishing line in a second line shoulder in a second position to enable the fishing line to be slidable along the line shoulder. The sleeve stop is positioned between the first position and the second position to prevent the movable sleeve from sliding over the entirety of the line shoulder in the second position.

Embodiments of the fishing tackle stem guide may include one or more of the following features. For example, the sleeve may be a compressible spring. The sleeve may be compressed up for one of fixed bobber fishing and slip bobber fishing and compressed down for the other of fixed bobber fishing and slip bobber fishing. The sleeve may be compressed either up or down for both of fixed bobber fishing and slip bobber fishing.

The first line shoulder and the second line shoulder may be a single line shoulder. The first line shoulder and the second line shoulder may be different line shoulders.

The sleeve stop may be a surface on the stem connector against which the sleeve expands in a lengthwise direction and the surface includes a notched or cut-out portion extending in the direction of the lengthwise expansion of the sleeve. The first line shoulder is positioned at least in part within the notched or cut-out portion such that in a fixed bobber position the fishing line is within the second line shoulder and the sleeve compresses the fishing line against the surface of the sleeve stop to prevent movement of the fishing line through the second shoulder and in a slip bobber position the fishing line is within the first line shoulder without being under compression by the sleeve such that the fishing line is movable through the first line shoulder.

The notched or cut-out portion may extend into the stem connector.

The elongated rod further may further include a flange encircling at least a portion of the elongated rod and the sleeve stop includes a surface on the flange against which the sleeve expands in a lengthwise direction and the surface includes a notched or cut-out portion extending in the direction of the lengthwise expansion of the sleeve, the first line shoulder including a portion being positioned within the notched or cut-out portion. In this manner in a fixed bobber position the fishing line is within the second line shoulder and the sleeve compresses the fishing line against the surface of the sleeve stop to prevent movement of the fishing line through the second shoulder and in a slip bobber position the fishing line is within the first line shoulder without being under compression by the sleeve such that the fishing line is movable through the first line shoulder.

The first line shoulder and the second line shoulder may be the same, may extend from the same line shoulder, or the first line shoulder and the second line shoulder may not be the same.

The elongated rod may further include at least one extension extending outwardly from the elongated rod that limits lengthwise expansion of the sleeve in a first direction, the stem connector includes a surface that limits lengthwise expansion of the sleeve in a second opposite direction and the first line shoulder is positioned such that a portion of the first line shoulder extends beyond the extension in the first direction of expansion of the sleeve. In this manner in a fixed bobber position the fishing line is within the second line shoulder and the sleeve compresses the fishing line against the surface of the stem connector to prevent movement of the fishing line through the second shoulder and in a slip bobber position the fishing line is within the first line shoulder without being under compression by the sleeve such that the fishing line is movable through the first line shoulder.

The elongated rod may include an axial opening therethrough.

The elongated rod may include a molded polymer with the one or more line shoulders molded therein to provide a radiused line shoulder.

The stem connector may include a stem cup having an internal securement surface therein on one end and a further stem cup on an opposite end. The fishing tackle stem guide may further include an extruded fishing float having a hollow stem with at least one end secured to the stem connector to enable a fishing line to extend through the axial opening in the elongated rod and the hollow fishing float stem to provide a slip bobber.

The fishing tackle stem guide may further include one or more of a light stick, a scent stick or a fishing float having a stem with at least one end secured to the stem connector.

The elongated rod may further include a solid portion and the line shoulder extends from an outer surface of the elongated rod to within a portion of the solid portion of the elongated rod.

In another general aspect, the invention is a method of using a stem guide in which a fishing line is attached to a stem guide. The stem guide includes an elongated rod, at least one sleeve stop, a stem connector, and a line stop system. The stem guide may be used in multi-season fishing bobber for either slip bobber fishing or fixed bobber fishing. The elongated rod has a hollow portion for receiving a fishing line and at least one line shoulder therein for receiving a fishing line, the line shoulder extending from an outer surface of the elongated rod to within the elongated rod. The at least one sleeve stop limits the movement of a sleeve in a lengthwise direction of the elongated rod. The stem connector is located on a first end of the elongated rod. The line stop system includes a movable sleeve positioned on the elongated rod and is located on a second end of the elongated rod for fixing a position of the fishing line in a first line shoulder relative to the elongated rod in a first position to enable the fishing line to be restrained from sliding along the first line shoulder and for positioning the fishing line in a second line shoulder in a second position to enable the fishing line to be slidable along the second line shoulder. In this manner the sleeve stop is positioned between the first position and the second position to prevent the movable sleeve from sliding over the entirety of the second line shoulder in the second position. The method of using the multi-season stem fishing bobber includes one or more of the following: (1) Compressing the sleeve, inserting a fishing line into the first line shoulder, and releasing the sleeve to allow the sleeve to compress the fishing line against a surface to enable the fishing line to be restrained from sliding along the first line shoulder; (2) compressing the sleeve, inserting a fishing line into the second line shoulder, and releasing the sleeve to allow the sleeve to expand against a surface such that the sleeve does not slide over the entirety of the second line shoulder and enables the fishing line to be slidable along the second line shoulder; and (3) optionally passing a fishing line through an axial channel passing though the stem guide.

Embodiments of the method may include one or more of the following features. For example, the method may further include compressing the sleeve up for one of fixed bobber fishing and slip bobber fishing and compressing the sleeve down for the other of fixed bobber fishing and slip bobber fishing. The method may further include compressing the sleeve either up or down for both of fixed bobber fishing and slip bobber fishing.

The sleeve stop may include a surface on the stem connector against which the sleeve expands in a lengthwise direction and the surface includes a notched or cut-out portion extending in the direction of the lengthwise expansion of the sleeve, the first line shoulder being positioned at least in part within the notched or cut-out portion, whereby in a fixed bobber position the fishing line is within the second line shoulder and the sleeve compresses the fishing line against the surface of the sleeve stop to prevent movement of the fishing line through the second shoulder and in a slip bobber position the fishing line is within the first line shoulder without being under compression by the sleeve such that the fishing line is movable through the first line shoulder.

The notched or cut-out portion may extend into the stem connector.

The elongated rod may further include a flange encircling at least a portion of the elongated rod and the sleeve stop may include a surface on the flange against which the sleeve expands in a lengthwise direction and the surface includes a notched or cut-out portion extending in the direction of the lengthwise expansion of the sleeve, the first line shoulder including a portion being positioned within the notched or cut-out portion. In this manner in a fixed bobber position the fishing line is within the second line shoulder and the sleeve compresses the fishing line against the surface of the sleeve stop to prevent movement of the fishing line through the second shoulder and in a slip bobber position the fishing line is within the first line shoulder without being under compression by the sleeve such that the fishing line is movable through the first line shoulder.

The first line shoulder and the second line shoulder may be the same, extend from the same line shoulder, or may not be the same.

The elongated rod may further include at least one extension extending outwardly from the elongated rod that limits lengthwise expansion of the sleeve in a first direction, the stem connector includes a surface that limits lengthwise expansion of the sleeve in a second opposite direction and the first line shoulder is positioned such that a portion of the first line shoulder extends beyond the extension in the first direction of expansion of the sleeve. In this manner, in a fixed bobber position the fishing line is within the second line shoulder and the sleeve compresses the fishing line against the surface of the stem connector to prevent movement of the fishing line through the second shoulder and in a slip bobber position the fishing line is within the first line shoulder without being under compression by the sleeve such that the fishing line is movable through the first line shoulder.

The elongated rod may include an axial opening therethrough and using the stem guide for slip bobber fishing includes passing a fishing line through the axial opening.

The elongated rod may include a molded polymer with the one or more line shoulders molded therein to provide a radiused line shoulder.

The elongated rod may further include a solid portion and the line shoulder extends from an outer surface of the elongated rod to within a portion of the solid portion of the elongated rod.

The stem connector may include a stem cup having an internal securement surface therein on one end and the method may further include securing a float to the stem connector to enable a fishing line to extend through the axial opening in the elongated rod and the hollow fishing float stem to provide a slip bobber.

The stem connector may include a stem cup having an internal securement surface therein on one end and the method further includes securing one or more of a light stick, a scent stick or a fishing float to the stem connector.

The sleeve may be a spring.

BRIEF DESCRIPTION OF THE DRAWINGS

FIG. 1 is front view, partially in section, showing the fishing tackle stem guide for temporarily attaching a fishing line thereto;

FIG. 2 shows the fishing tackle stem guide of FIG. 1 with a light stick therein;

FIG. 3 shows the fishing tackle stem guide of FIG. 1 with a scent stick therein attached to a fishing line;

FIG. 4 shows the fishing tackle stem guide of FIG. 1 as a kit with an adhesive to allow a person to secure the fishing tackle stem guide to various types of fishing tackle;

FIG. 5 shows a prior art slip bobber partially in cross section;

FIG. 6 shows the stem guide of FIG. 4 secured to the end of the stem of the prior art float of FIG. 5;

FIG. 7 shows a partial view of the rod in the fishing tackle stem guide of FIG. 1;

FIG. 11 shows the fishing tackle stem of FIG. 9 formed as an integral portion of a slip bobber;

FIG. 12 shows a side view of a portion of slotted stem in fishing tackle stem guide of FIG. 9;

FIG. 12A shows a top view of the slotted stem of FIG. 12;

FIG. 13 shows a top view of a sleeve that fits around the slotted stem of FIG. 12;

FIG. 14 shows a bottom view of the sleeve of FIG. 13; and

FIG. 15 shows an assembled top view of the stem of FIG. 12 and the sleeve of FIG. 13.

DESCRIPTION OF THE PREFERRED EMBODIMENT

Figure 8:
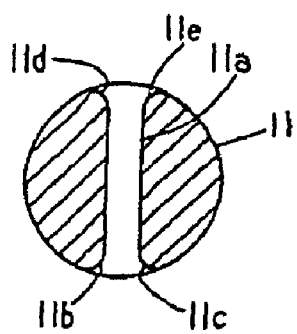
FIG. 8 shows a cross sectional view taken along lines 8-8 of FIG. 7.

FIG. 1 is front view, partially in section, showing a molded fishing tackle stem guide 10 for temporarily attaching a fishing line thereto. Stem guide 10 includes an elongated rod 11 having a stem connector 12 on one end and a line stop 10a on the other end with the line stop 10a including an annular spring stop 13 on the opposite end. Line stop 10a includes a first L shaped line shoulder 11a for engaging a fishing line and a second circular line shoulder 11b for engaging fishing line that is inserted therethrough. Both line shoulders are characterized by having rounded corners by molding the stem connector 12 rather than extruding the stem connector 12 to thereby avoid sharp edges found with extruded articles that can cut or abrading the fishing line. The molded rounded shoulder 11a on the rod 11 is illustrated in FIG. 7 and FIG. 8 by reference numerals 11b, 11c, 11d and 11e which show the radiused rather than abrupt corners where the fishing line rests on when the fishing line is held in a fixed condition in the line stop 10a.

A sleeve comprising a cylindrical compression spring 14 is retained on rod 11 by the stem connector 12 and the annular spring stop 13 to enable a fishing line to be restrained from sliding along the line shoulder 11a or 11b by the frictional engagement of the line between the sleeve 14 and the rod 11 as the line is held in a non linear condition within the confines of the compression spring 14. This type of line stop with compression spring and radiused shoulders is found as an integral part of the Lucky Jack™ Bobber sold by ROD-n-BOBB'S of Eau Claire, Wis.

Extending axially through the stem guide 10 is a tube 15 or central line guide that allows a fishing line to slide freely therethrough. A purpose of the tube or central line guide 15 is to allow the stem connector 12 to be secured to a hollow stem of a slip bobber to convert the slip bobber to a fixed bobber.

In the embodiment shown the stem connector 12 forms an open-ended stem cup that has a large opening 16a on one end and has a closed end 16b penetrated by the tube 15. The stem cup 12 has an inner cylindrical securement surface 16 that can be attached to the user's fishing tackle either through a friction fit or a more permanent attachment using an adhesive, molding or the like. The stem connector 12 and the rod 11 are molded from a polymer plastic such as Nylon or Polycarbonate to provide a one-piece unit that together with the compression spring sleeve 14 can be secured to any number of different types of fishing tackle by insertion of a portion of the fishing tackle into the open-end 16a of stem cup 12. In the embodiment shown the stem cup 12 has an inner diameter $D_1$ on the upper portion of the stem cup. If desired the stem cup can be provided with bands of different inner diameter on the upper portion of the stem cup to permit the stem cup to engage different diameter end sections on various types of fishing tackle. Thus the stem guide provides a means to secure various sizes of fishing tackle to a fishing line.

Figure 1A:
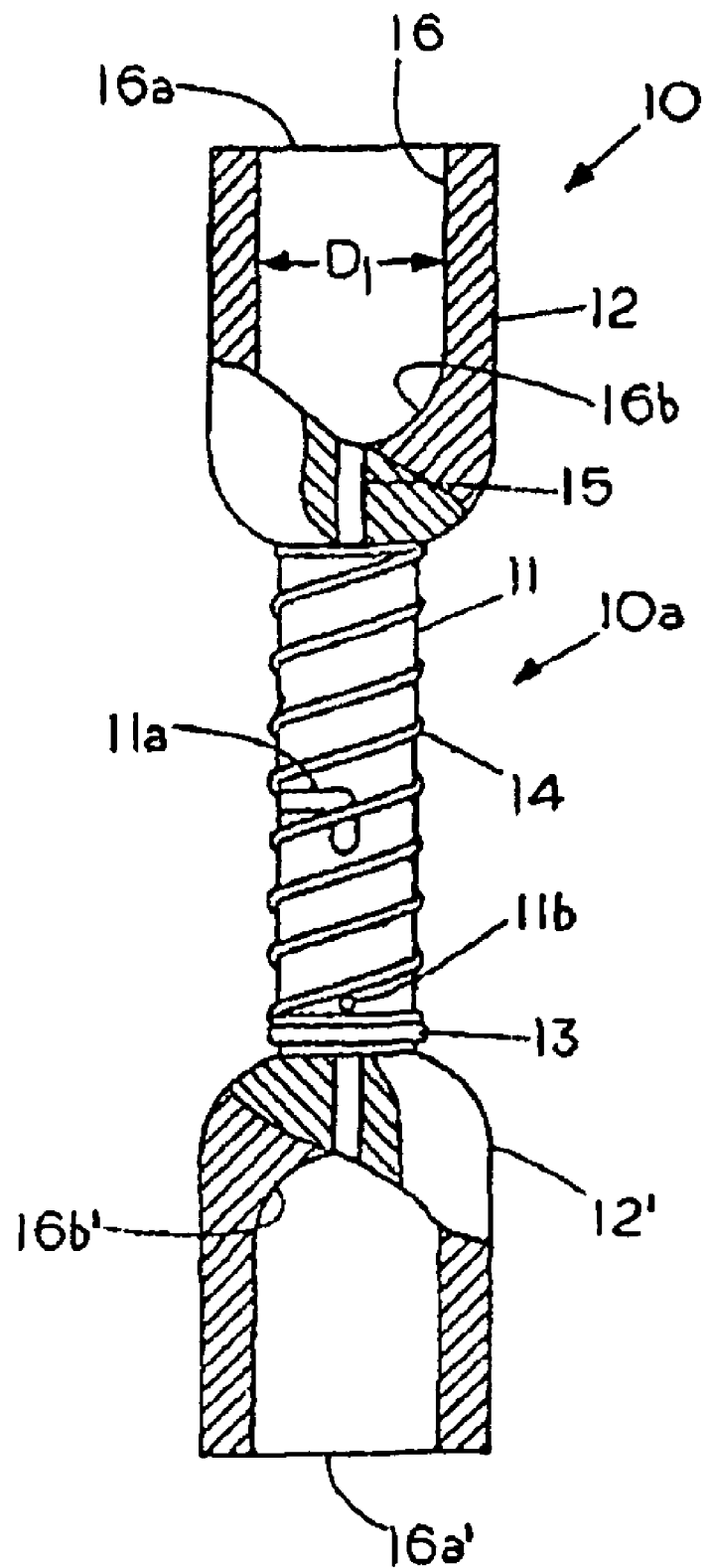
FIG. 1A is a fishing tackle stem guide with for temporarily attaching a fishing line thereto and with dual stem cups.

FIG. 1A shows another embodiment of the stem guide wherein the stem guide 10 is shown with a second stem cup 12' having a base secured to the stem guide 10 with the second stem cup 12' identical to the stem cup 10 and having an open end 16a' and a closed end 16b' with the central passage 15 extending therethrough. With the embodiment of FIG. 1A one can attach two items to the fishing line. For example, one might attach a scent stick in one stem cup and a light stick in the other stem cup or one might have scent sticks or light sticks in both cups.

FIG. 2 illustrates the stem guide 10 connected to a commercially available light stick 20, which is often used in fishing floats or the like. In the present application the stem guide 10 engages the sidewalls of the light stick to frictionally hold the light stick 20 therein while the spring 14 and stem 11 coacts to form a line stop to hold the fishing line 21 thereto. When used in this manner the stem guide 10 enables a fisherperson to know where the fishing line is located. Once the light stick 20 is spent the light stick can be removed and replaced with a fresh light stick. In addition the light stick 20 can be removed and replaced with a light stick that generates a different colored light thus giving the fisherperson the option of selecting the proper light.

FIG. 3 illustrates still another use of the stem guide 10 showing a scent stick 24 secured to the fishing line 10 with the scent stick located on the fishing line 25 and proximate the fish hook 26. A scent stick can comprise a stick of material that is an attractant to fish. The fisherperson can place the bait on the hook 26 and in addition can attach the stem guide 10 with the scent stick 24 proximate the fishing hook to act as an attractant to bring the fish to a position where it can spot the bait on the hook 26. Thus the stem guide can be used to hold scent attractants proximate a hook on a fishing line.

A further use of the stem guide is to hold items such as buoy markers so that one can mark off an area.

FIG. 4 shows a fisherperson's stem guide kit 30 that comprising a transparent envelope or pouch 32 having a stem guide 10 therein together with a tube of an adhesive 31 having a cap 31a thereon. To use the kit 30 the user opens pouch 30 and removes the stem guide 10 and the tube of adhesive from the pouch 30 and places a drop of adhesive from the tube of adhesive 31 on the inside of the stem connector 12. To illustrate the use of the stem guide kit reference should be made to FIG. 5 which shows a prior art extruded slip bobber 40 comprising a float 41 having a hollow upper stem 42 and a lower hollow stem 42a with a fishing line 43 slideable extending through the stems and the float.

Another popular prior art bobber is a fixed stick bobber. The fixed stick extruded bobbers generally have a solid stem and lack the hole through the stem to enable the bobber to be used as a slip bobber. In order to reduce manufacturing costs the stick bobbers are extruded. Although the stick bobbers can be manufactured relatively inexpensive the stick bobbers suffer when uses as a fixed bobber. That is, to make the extruded bobber a fixed bobber a saw cut is made part way into the stem of the stick bobber. The saw cut is then used to hold the line to prevent the line from slipping. Unfortunately, the saw cut in the stem of the bobber has sharp edges which can cause the fishing line to break. To alleviate the problem of line weakening while maintaining low cost in bobber manufacture the molded stem guide 10 of the present invention can be incorporated onto the existing stem of a fixed bobber or slip bobber to a line-friendly bobber. While the stem guide 10 is shown in use with the slip bobber 40, the stem guide can also be used with a fixed bobber. For example, one may want to eliminate the saw cut on the fixed bobber and replace an end portion of the stem with the stem guide 10 having the rounded line shoulders obtainable by molding to thereby placing a line friendly line stop on the fixed bobber.

FIG. 6 shows the prior art conventional extruded slip bobber 40 that has been converted to a combination slip bobber/fixed bobber during a fishing outing by the placement of the stem cup 12 of the stem guide 10 on the end of the lower hollow stem 42a of the fishing bobber 40 by engaging the sidewalls 16 of the stem cup 12 with the outer surface of the lower stem 42a. By use of an adhesive or the like the user has fixedly secured the stem guide 10 to the fishing float 40 thus making the slip bobber 40 a combination slip bobber/fixed bobber. A feature of the present invention is that it reduces the cost of making a fishing bobber that is not harsh on the fishing line. Conventional bobbers are generally formed through an extrusion molding process and sawing process that result in sharp edges that can abrade the fishing line during use. To mold the bobber and the line stop in one piece increases the cost of the bobber; however, by molding only the stem guide which holds the fishing line 43 and the fishing bobber 40, and then securing the stem guide to the stem of a stick float one can create a fishing bobber that is not harsh on the fishing line but one can also reduce the cost of making the fishing bobber since the costs of molding an entire fishing bobber is more costly than molding only the stem guide for the bobber. Thus the bobber comprises two distinct portions: an extruded body portion and a molded end portion that can hold the fishing line in a manner that inhibits or prevents abrasion of the fishing line. By molded it is meant that the surfaces can be formed by allowing the molten plastic to set within the confines of a mold. Consequently, one can introduce smooth surfaces into the article and thus avoid sharp edges that are inherent in an extrusion process.

As shown in FIG. 6 the fishing line 43 extends through the hollow tube and through the stem guide 10 and can be temporarily secured to the stem 11 though the compression spring 14 thus providing fixed bobber operation. Thus, the kit 30 can convert a slip bobber to a fixed line bobber but more significantly the operation can on-the-go provide a slip bobber with a line stop that does not weaken or cut the fishing line. That is, by inserting the inner surface 16 into engagement with the exterior cylindrical surface of the hollow stem 42a one can fasten the stem guide 10 to available slip bobbers. A further use of the stem guide 10 is that even with fish slip bobbers/fixed bobbers that have a harsh line stop such as a saw cut stem one can replace a harsh line stop with the stem guide 10 with the radiused corners by severing the end of the stem in the float that contains the saw cut and securing the stem guide 10 to the float stem to reduce line abrasion.

Figure 9:
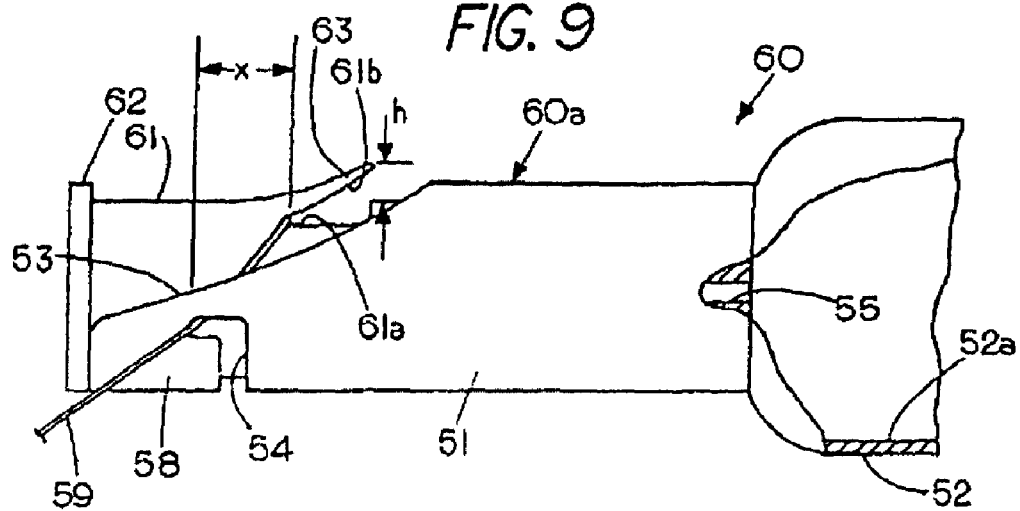
FIG. 9 shows a side view of another embodiment of fishing tackle stem guide secured to fishing line.
Figure 10:
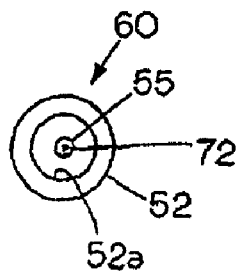
FIG. 10 shows a top view of the fishing tackle stem guide of FIG. 9.

FIG. 9 shows another embodiment of a fishing tackle stem guide 60. Fishing tackle stem guide 60 includes a molded stem connector 52 on one end and a molded line stop 60a on the opposite end for temporarily securing fishing line thereto. Fishing tackle stem guide 60 includes a stem connector 52 having an inner cylindrical surface 52a for connecting to a fishing float, a scent stick, a light stick or other types of fishing tackle such as stem guide 10. A tube 55 extends axially through a cylindrical rod 61 to enable the stem guide 60 to be attached to an end of a slip bobber to convert the slip bobber to a fixed stop bobber. Rod 61 includes an annular end stop 62 that maintains a cylindrical sleeve 51 in a working relationship with stem 61 although other methods of holding the sleeve 51 on the rod such as by pining or adhesively securing the sleeve thereto could be used.

The line stop stem rod 61 is shown in isolated side view in FIG. 12 and in an isolated top view in FIG. 12A revealing the lip 63 that has been formed in stem rod 61 with the lip projecting a distance "h" above the stem rod 61. Lip 63 has an undersurface 61b and a shoulder 61a that forms a v-shaped groove that allows a fishing line to be wedged between undersurface 61b and shoulder 61a by axially pulling the fishing line toward the annular end 62. To illustrate the wedging action, a fishing line 59 is shown in a wedged condition in FIGS. 12 and 12A.

FIG. 9 shows the stem rod 61 of line stop 60a including a cylindrical sleeve 51 having an edge 53 defining an opening in the sleeve that exposes the upward projecting line lip 63. Line lip 63 projects a distance "h" above the rod 61 to enable a fishing line 59 to be slid axially along the stem connector 52 toward the annular end stop 62 and in doing so cause the fishing line to be guided under the lip 63 and onto the shoulder 61a under the lip 63 where the fishing line is secured therein by the coaction of the undersurface 61b and the shoulder 61a. Once the fishing line engages the shoulder 61a the fishing line 59 is wrapped partially around the rod by slipping the fishing line between the sleeve 51 and the rod 61 and then out the L-shaped line shoulder 54 in sleeve 51 as shown in FIG. 9. Thus, the end portion forms a first ear 58 that enables the fishing line 59 to be held around a portion of rod 61. Similarly, the opposite side of sleeve 51 includes an ear 58a (see FIG. 13), which allows the fishing line 59 to be held around a further portion of rod 61. The use of a molded stem guide allows one to make rounded shoulder on the line stop so as to minimize abrasion to the fishing line. A further feature of the embodiment of FIG. 9 is that the line stop is all plastic and includes no metal springs so as to further reduce line abrasion. Thus, the fishing line 59 is wedged beneath the lip 63 and extends at least partially around the elongated rod 61 and the sleeve includes a set of ears 58 and 58a to hold the fishing line beneath the lip with the lip spaced from an line shoulder or eye 54 in the sleeve 51 and an identical line shoulder or eye in the opposite side of sleeve 51 to hold the fishing line 59 in an offset condition to prevent slippage of the fishing line therein.

FIGS. 13 and 14 show an isolated view of the cylindrical sleeve 51 showing the V shaped edge 53 that forms an opening therein to allows projection of the lip 63 therethrough as well as the ears 58 and 58a that extend around rod 61 to hold a fishing line therebetween in a nonlinear condition so that a pulling force on the line brings the fishing line into wedged engagement between surface 61b and shoulder 61a.

FIG. 9 shows the fishing line 59 is held a spaced distance x from the bottom of the v-shaped grove between lip 63 and shoulder 61a so that a pulling force on line 59 causes the fishing line to be pulled tighter into the v-shaped groove thus inhibiting or preventing the fishing line from sliding in the line stop 60a.

FIG. 15 shows an isolated top view of the sleeve 51 and rod 61 with the line 59 held between the inner surface of sleeve 51 and the outer surface of rod 61 to maintain line 59 in the wedged condition between surface 61b and shoulder 61a. That is, by having the line held around the rod 61 by the ears 58 and 58a it causes the fishing line to be wedged between the surface 61b and shoulder 61a to frictionally hold the line in position beneath the lip 63 as a pulling force is applied to the fishing line. Thus, the embodiment of FIG. 9 eliminates the point contact on the fishing line found in line stops with springs since the contact with the fishing line in the line stop of FIG. 9 is over an extended area under lip 63 and between the rod 61 and the sleeve as illustrated in FIGS. 9 and 15. Thus the embodiment of FIG. 9 allows one to hold a fishing line therein through elimination of the spring as shown in the embodiment of FIG. 1.

FIG. 11 shows a lighted fishing slip bobber, which contains a light source therein (not shown) with the line holder 60 shown in FIG. 9 integrally formed to bobber 70. In this embodiment of the lighted fishing bobber the line stop of FIG. 9 has been integrally formed onto the end of the bobber 70. Bobber 70 is a slip bobber and includes a tube 71 with a line 72 extending therethrough. Although the lighted bobber 70 is a slip bobber the bobber 70 can also function as a fixed line bobber since the cylindrical sleeve 60 and the rod 61 coact to frictionally grip the line as illustrated and described with respect to FIG. 9. Thus in the embodiment of FIG. 11 the use of a compression spring as the sleeve has been eliminated with the use of the line stop of FIG. 9.

The invention includes a method of securing an item of fishing tackle to a fishing line by engaging a first end of a stem connector 10 or 60 with an item of fishing tackle and inserting a fishing line into a line stop on the second end of the stem connector to secure a fishing line thereto to thereby secure both the stem connector and the item of fishing tackle to the fishing line. For example, if one engages the stem connector 10 or 60 with an end of a slip bobber 40 as shown in FIG. 5 one can provide fixed bobber operation to the slip bobber. If desired, one can integrally form the stem connector 60 to a slip bobber as shown in FIG. 11 to provide fixed bobber operation of the slip bobber.

The invention also includes a method of inserting a fishing line into a line stop of the fishing tackle line guide of FIG. 9 by extending a fishing line between an outer surface of a rod in the line stop and an inner surface of a sleeve 51 on the rod to secure the fishing line therebetween as well as extending the fishing line beneath a lip 63 on the line stop 60a to at least partially secure the fishing line therein.

Further methods of attachment include the step of securing a light stick a scent stick or other items of fishing tackle to a stem cup in the stem connector. In addition if desired the stem cup could be a rod or the like to provide a male fitting rather than a female fitting.

The inventor also has developed a multi-season fishing tackle stem guide that is configured for one or more of winter slip fishing, summer slip fishing, and fixed fishing. The stem guide has a line stop system that can be varied to permit one or more of the following: (a) position the fishing line within a first opening or shoulder that is used for fixed, e.g., fixed bobber, fishing, (b) position the fishing line within a second opening or shoulder that is used for winter slip, e.g., slip bobber, fishing, and (c) position the fishing line within a third opening that is used for summer slip, e.g., slip bobber, fishing. References herein to slip or fixed bobber fishing also should be interpreted to be understood to include slip of fixed fishing with a light stick, scent stick and the like because the stem guide can be attached to fishing articles other than a bobber.

The stem guide is configured to permit winter slip bobber fishing by positioning the fishing line under the water when the stem guide is in the water such that freezing air does not cause water on the line to freeze the line against a surface on the bobber. Because the fishing line will pass through and be positioned within the stem guide entirely under the water, the fishing line will not freeze against a surface of the bobber. The stem guide is configured to do this by causing the fishing line to be positioned in a slot or opening that is not enclosed, surrounded or otherwise in frictional contact by a sleeve, spring or compression means during winter slip bobber fishing. In some implementations, the sleeve may be compressed in one lengthwise direction for one type of fishing and compressed in an opposite direction for another type of fishing.

The stem guide offers other advantages, as described in part with respect to FIG. 1. The stem guide includes an elongated rod with one or more shoulders to receive a fishing line. In the prior art fishing bobbers the angler had limited options to have an optimal fishing bobber. For summer slip bobber fishing, the stem of the fishing bobber typically is an extruded tube through which an axial channel runs. The fishing line passes through this channel for slip bobber fishing. An advantage of extruded tube is that it is relatively inexpensive to produce. But this type of slip bobber fishing will not work at temperatures below freezing where the exposed portion of the line extending out of the elongated rod and water will freeze to the rod. Further, to attempt to make this extruded tube useful for fixed bobber fishing requires cuts to be made into the tube to form shoulders to receive the fishing line. These cuts are undesirable because they are sharp and can cut or weaken the line when the line is pulled against the sharp edge of the cut. Instead, some companies attempt to mold the elongated rod to contain the shoulders. A molded, full-length elongated rod to use as a stem for a stick bobber is relatively expensive because each piece is separately molded.

The multi-season fishing tackle stem guide for winter slip bobber fishing, summer slip bobber fishing, and fixed bobber fishing differs from the stem guide of FIG. 1 generally by the inclusion of a means similar to the shoulder for fixed bobber fishing. Instead of being used for fixed bobber fishing the means permits winter slip bobber fishing without the nicks and saws cuts that can damage a soft, flexible fishing line because the stem or elongated rod is molded to have smooth or radiused edges. In some embodiments, the molded rod has two shoulders—each having smooth or radiused edges. In other embodiments, the molded rod has one shoulder that then extends into two shoulders—each having smooth or radiused edges. For both embodiments, the molded rod may have a channel extending between both ends of the rod. Because the rod is molded, the channel is not necessarily round or centered along the central axis. The diameter of the channel should be sufficiently large to permit a fishing line to easily pass through for summer slip bobber fishing. The shoulders should be formed during the molding, e.g., injection molding, such that they are entirely or primarily positioned within the solid portion of the rod. By placing the stem from a stick bobber into the stem cup, an angler can pass a fishing line into the bottom end of the channel in the elongate rod and into the axial channel passing through the stick bobber, as shown in FIG. 6.

Figure 16:
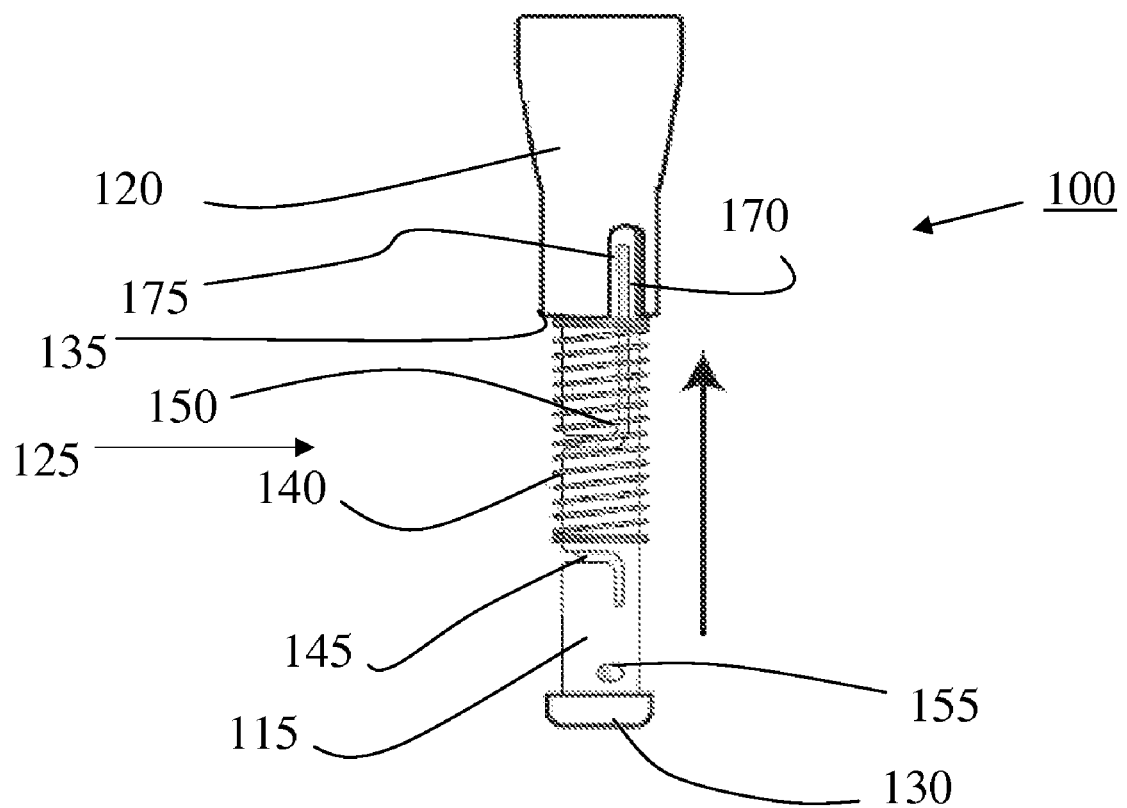
FIG. 16 is a front view of a multi-season stem guide in which a spring is compressed upwardly for fixed bobber fishing.
Figure 17:
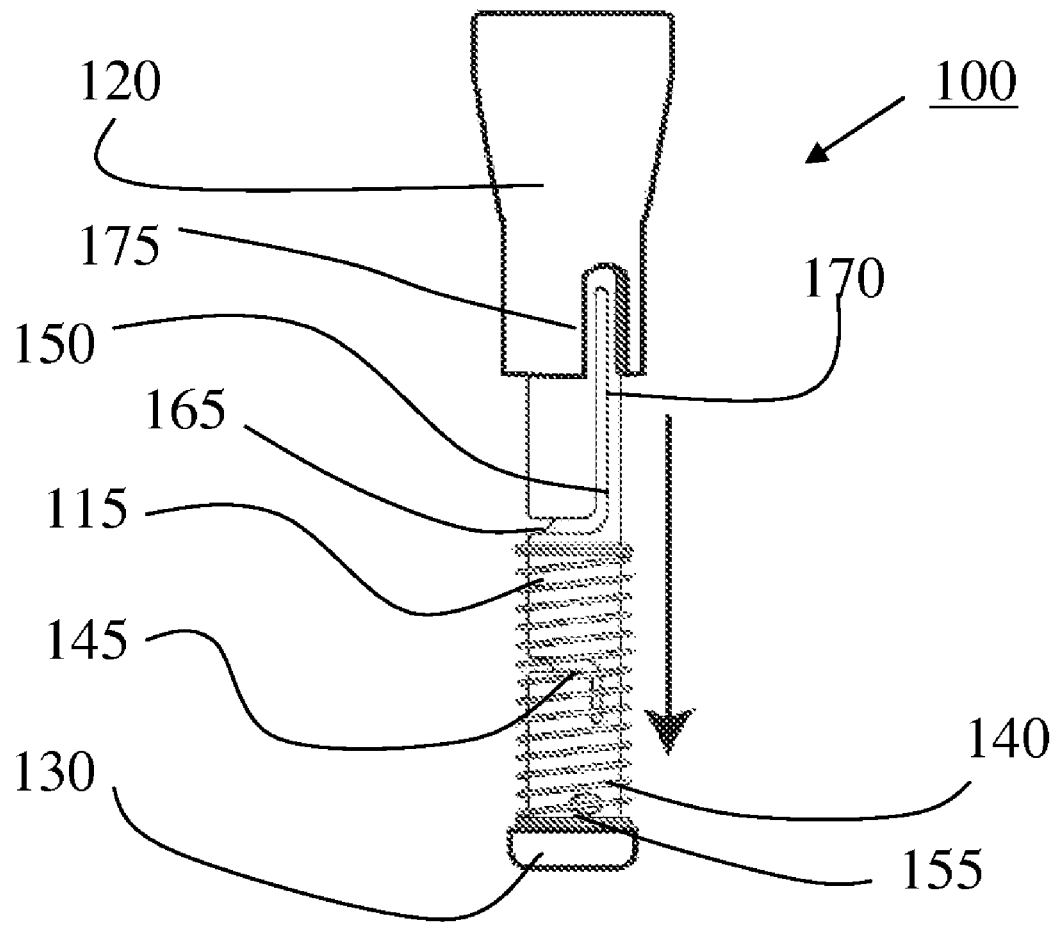
FIG. 17 is a front view of the multi-season stem guide in which a spring is compressed downwardly for winter slip bobber fishing.
Figure 18:
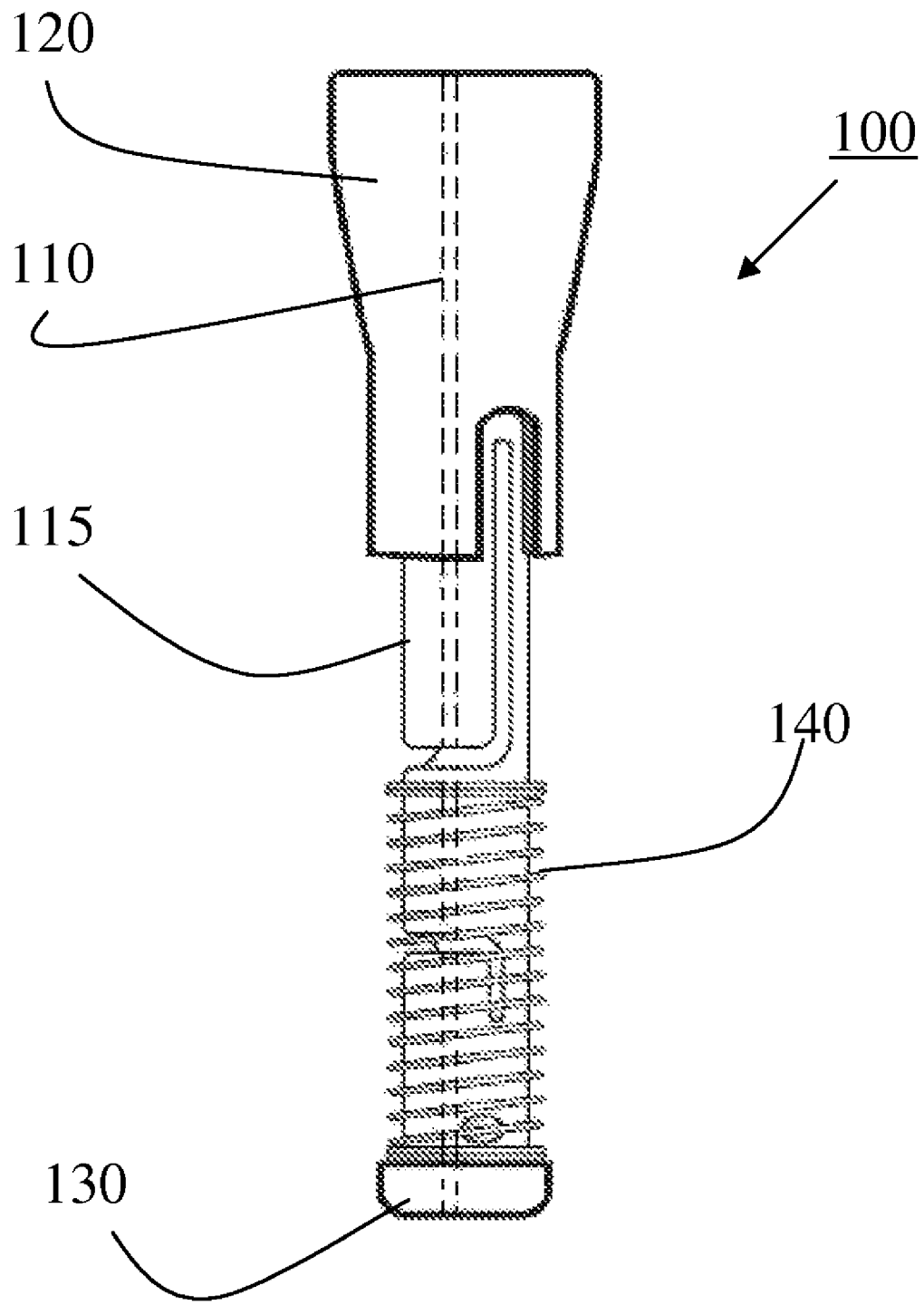
FIG. 18 is a front view of the multi-season stem guide showing a cross-sectional view of a channel passing through the stem guide.

FIGS. 16, 17 and 18 are front views of a multi-season fishing tackle stem guide 100 for temporarily attaching a fishing line. The stem guide 100 includes an elongated rod 115 having a stem connector 120 on one end and a line stop system 125 on the other end. A channel 110 extends the length of the elongated rod 115 and opens in the stem connector 120 to form a stem cup for receiving a fishing article. The channel is shown in FIG. 18 to illustrate the placement of the fishing line. The channel 110 can be wider than illustrated in FIG. 18 and may vary in diameter over the distance of the rod and stem connector. The line stop system 125 includes a flange or annular sleeve stop 130 on one end and the stem connector 120 on the opposite end. The line stop system 125 further includes a first L shaped line shoulder 145, a second L-shaped line shoulder 150 and an optional circular line shoulder 155. Each of the line shoulders are used to engage a fishing line that is inserted there through. Each line shoulder also has a smoothed or radiused edge without cuts or nicks and is configured to prevent damage to the fishing line. This generally is accomplished by making the rod using molding, e.g., injection molding.

A sleeve 140 encircles at least a portion of the rod 115 and can be moved along the length of the rod between the annular sleeve stop 130 and the stem connector 120. The sleeve 140 may be a spring. A base 135 of the stem connector 120 acts as an upper stop for the upper movement of the sleeve while the annular sleeve stop 130 acts as a lower stop of the downward movement of the sleeve. The stem connector 120 also includes a pair of notched or cut out sections 175 that extend upward from the base 135 and surrounds a portion 170 of the second L-shaped shoulder 150. The pair of notched sections 175 is used such that a fishing line can pass freely through the rod 115 by entering one notched section 175 and passing out of the rod through a second notched section 175.

In general, the sleeve 140 will extend the length of the rod between the stem connector 120 and the sleeve stop 130. In FIGS. 16 and 17, the arrows adjacent to the rod 115 are used to indicate the compression of the sleeve in one direction or the other. In FIG. 16 the sleeve 140 is compressed up on the rod against the stem connector 120 such that the sleeve encircles a portion of the shoulder 150 while exposing the shoulders 145 and 155. However, the portion 170 of the shoulder 150 remains unencircled by the sleeve because the sleeve cannot extend beyond the base of the stem connector 120. In contrast to the configuration illustrated in FIG. 16, in FIG. 17 the sleeve 140 is compressed down on the rod against the annular sleeve stop 130 such that the sleeve encircles the shoulders 145 and 155 while exposing the shoulder 150.

By use of the shoulders 145 and 150, the multi-season fishing tackle stem guide 100 can be used for multiple types of bobber fishing, e.g., slip bobber fishing, fixed bobber fishing, and multi-season fishing, e.g., summer fishing and winter fishing. In winter fishing where the outside temperature is below freezing, the angler with a slip bobber must ensure that the fishing line passing through the bobber does not become frozen against a surface of the bobber. For example, as illustrated in FIG. 18, if the fishing line was to pass through the longitudinal channel 110 in the rod 115 and the stem connector 120, the water on the line in the bobber above the water would freeze the line to the channel 110 and prevent movement of the line in the channel. To counter this problem, the angler using the stem guide 100 in winter slip bobber fishing pulls the sleeve 140 down as illustrated in FIG. 17 and passes a fishing line through the upper shoulder 165 and up into slot extension 170. Upon releasing the sleeve 140 such that it is extended between the annular sleeve stop 130 and the base 135, the fishing line is trapped within the notched section 175. In this position, the fishing line can slide through the slot portion 170.

It should be noted that the position of the channel 110 within the rod can vary but generally will not be positioned such that the shoulders 145 and 150 extend into the channel. However, in some embodiments, a portion of the shoulders may extend into the channel 110.

As illustrated in FIG. 16, to use the stem guide 100 in fixed bobber fishing, the sleeve 140 is pulled up and the fishing line is passed into the lower shoulder 145. Upon releasing the sleeve 140 such that it is extended between the annular sleeve stop 130 and the base 135, the fishing line is trapped within the lower shoulder 145 and under the sleeve 140. Specifically, the fishing line passes between the annular sleeve stop 130 and the base of the sleeve 140 and then between the sleeve and the rod 115 before passing through the lower shoulder 145. The fishing line then passes out of the lower shoulder 145, between the sleeve and the rod, and finally between the sleeve stop 130 and the base of the sleeve 140. In this configuration, the fishing line is trapped in place and unable to slide through the lower shoulder 145.

Figure 19:
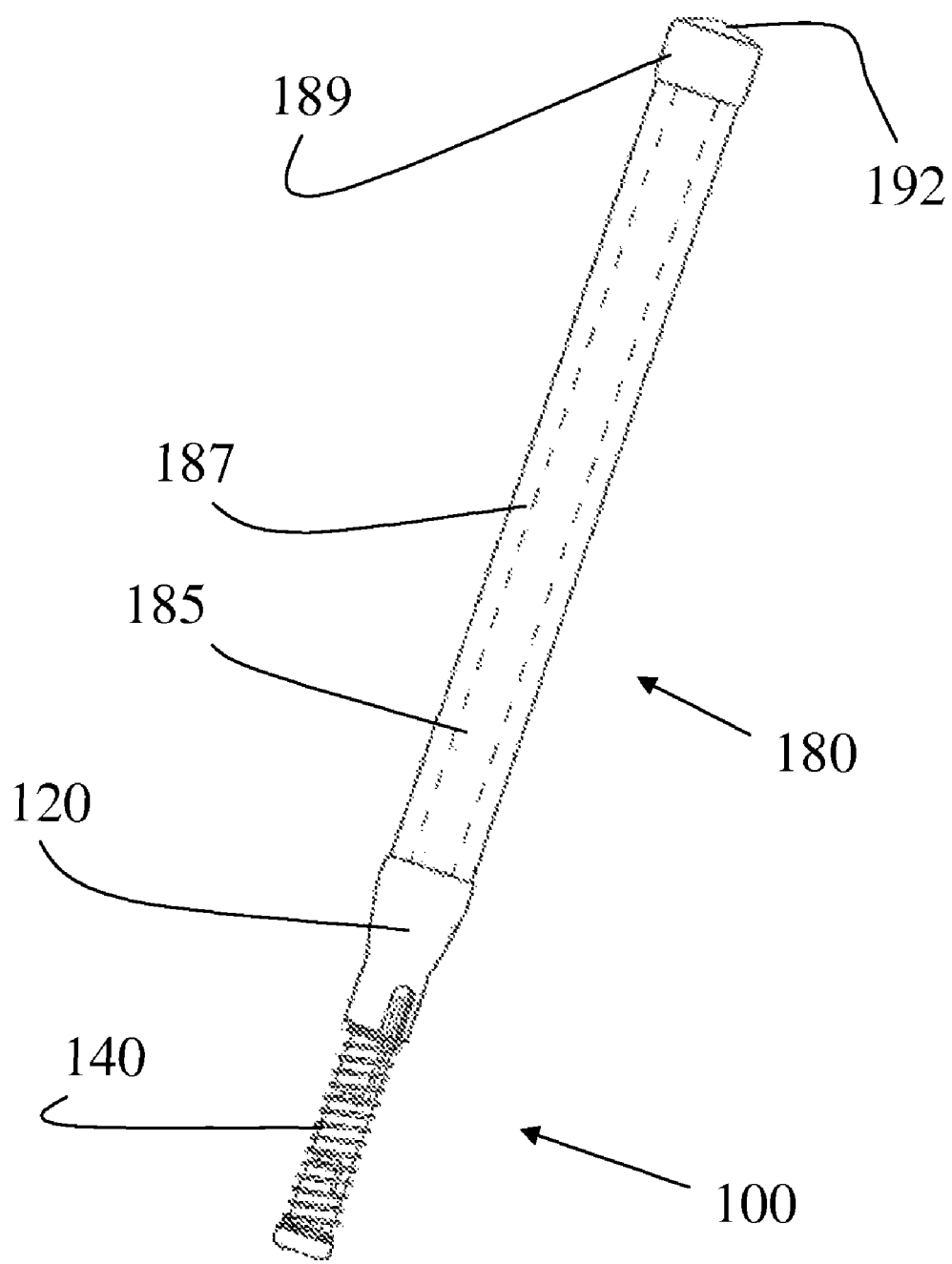
FIG. 19 is a front view of the multi-season stem guide of FIG. 16 showing a float attached to the stem guide.

Referring to FIG. 19, a fishing bobber rig 180 is assembled from the stem guide 100 attached to a foam stem 185 through which a channel 187 passes. The channel 187 is in connection with the channel 110 in the stem guide 120 such that a fishing line can pass through the fishing bobber rig 180 if used for slip bobber fishing in warmer weather. The sleeve 140 can be compressed downward to use the bobber for slip bobber for slip bobber fishing in freezing weather or compressed upward to the bobber for fixed bobber fishing in the warmer weather. The foam stem 185 can be replaced with other types of fishing components. For example, a light rod can be substituted for the foam stem. As described elsewhere herein, the foam stem 185 or light rod can be friction fit within the stem cup or held in place with an adhesive. Similar to the configuration illustrated in FIG. 6, the stem guide 100 can be attached to the stem of a stick bobber. In general, the stem cup can be interfaced with any mating fishing article using a friction fit, adhesive or other attachment means. In this manner, most fishing articles can be optimized for winter slip bobber fishing, summer slip bobber fishing and fixed bobber fishing merely by attaching them to the stem cup of the stem guide 100.

Figure 20:
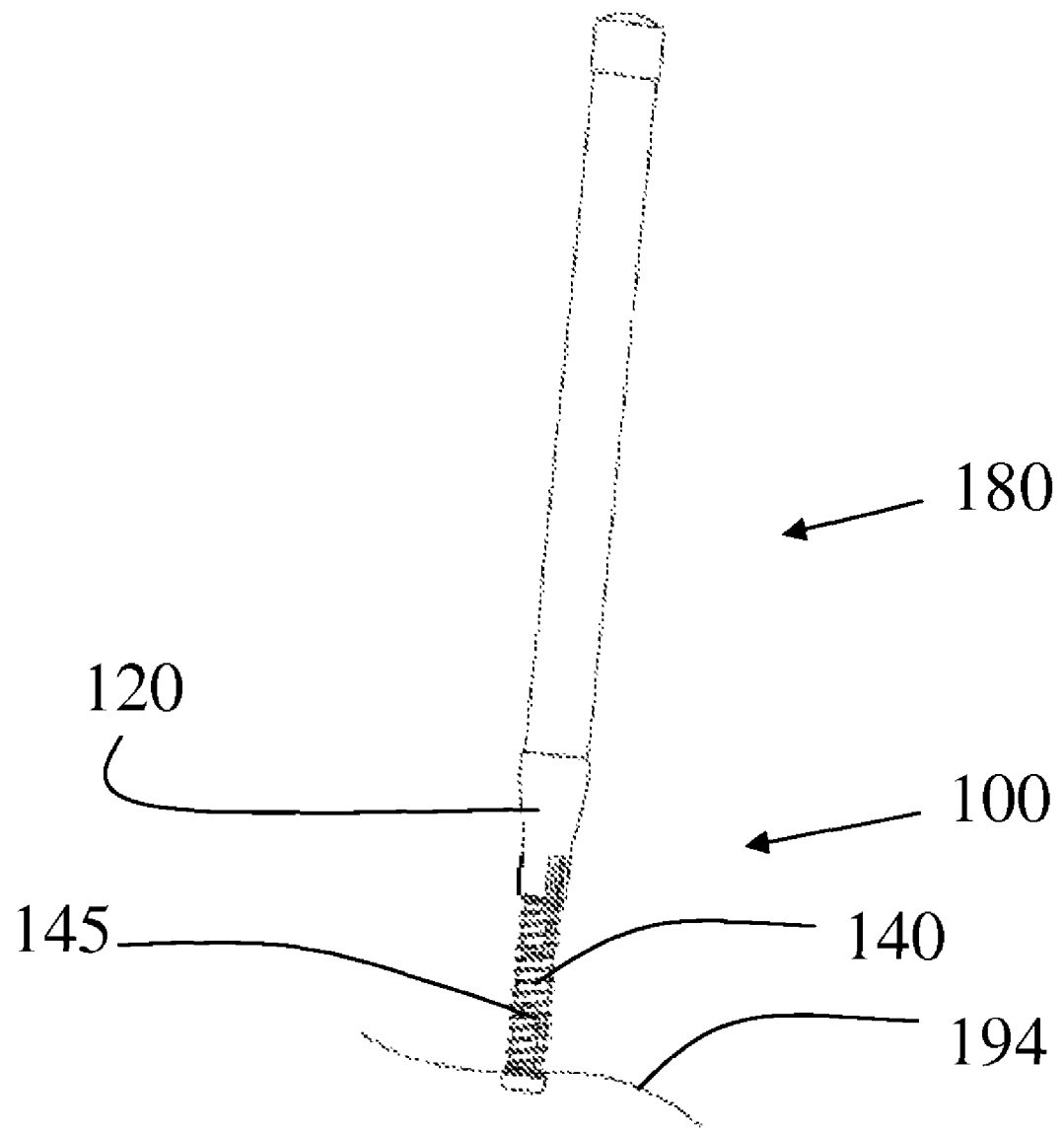
FIG. 20 is a front view of the multi-season stem guide of FIG. 19 configured for fixed bobber fishing.

Referring to FIG. 20, the fishing bobber rig 180 is shown configured for fixed bobber fishing. To use the fishing bobber rig for fixed bobber fishing, the user compresses the sleeve 140 upwardly and passes a fishing line 194 through the lower shoulder 145. Upon releasing the sleeve 140, the fishing line 194 is fixed in position against the rod 115. When the user casts the fishing bobber rig 180, the interaction between the sleeve 140, rod 115 and fishing line 194 keeps the fishing bobber rig from sliding along the line 194.

Figure 21:
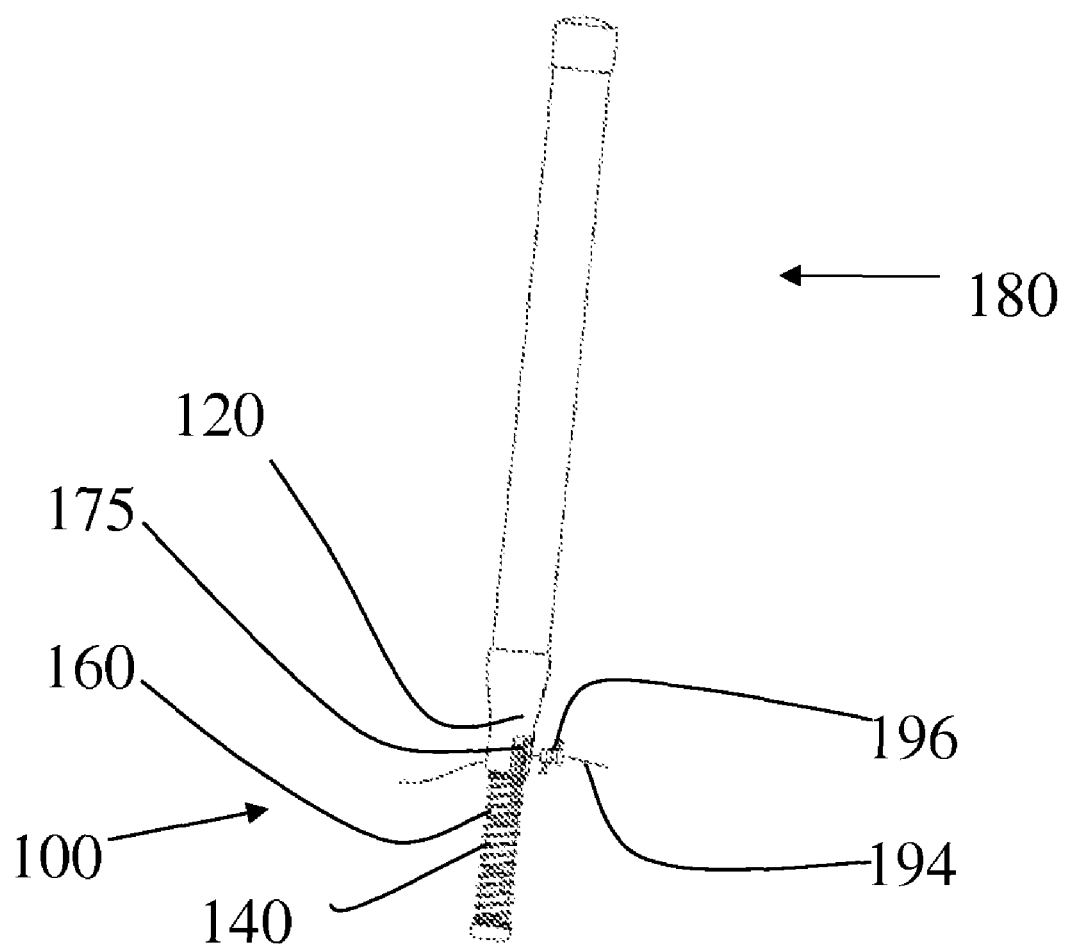
FIG. 21 is a front view of the multi-season stem guide of FIG. 19 configured for winter slip bobber fishing.

Referring to FIG. 21, the fishing bobber 180 is shown configured for slip bobber winter fishing, in particular when the air temperature is at or below freezing and there is a need to prevent the water on the fishing line from freezing to a surface on the fishing bobber rig 180. To use the fishing bobber rig for slip bobber winter fishing, the user compresses the sleeve 140 downwardly and passes a fishing line 194 through the upper shoulder 165. Upon releasing the sleeve 140, the fishing line 194 is trapped in a slidable configuration within the portion 170 in the rod 115. When the user casts the fishing bobber rig 180, the fishing bobber rig can slide along the line 194. For example to cast, the user reels in the fishing line until the hook or other fishing apparatus at the end of the line is adjacent to the bobber rig 180. As illustrated in FIG. 21, a knot 196 is tied onto the fishing line 194. The knot 196 is of a size small enough to be reeled in and through the eyelets on the fishing rod (not shown) but large enough such that the knot will not pass through the shoulder 165 or the portion 170.

Upon casting out, the hook, weights or other gear attached to the end of the fishing line will sink into the water while the buoyancy of the fishing bobber keeps it floating on the surface. The fishing line 194 will continue to pass through the portion 170 until the knot 196 reaches the portion 170. Certain portions of the fishing bobber 180 will be above the water line and other portions below the water line. In particular, the portion 170 will be positioned below the water surface such that the fishing line 194 will not freeze against the bobber.

Figure 22:
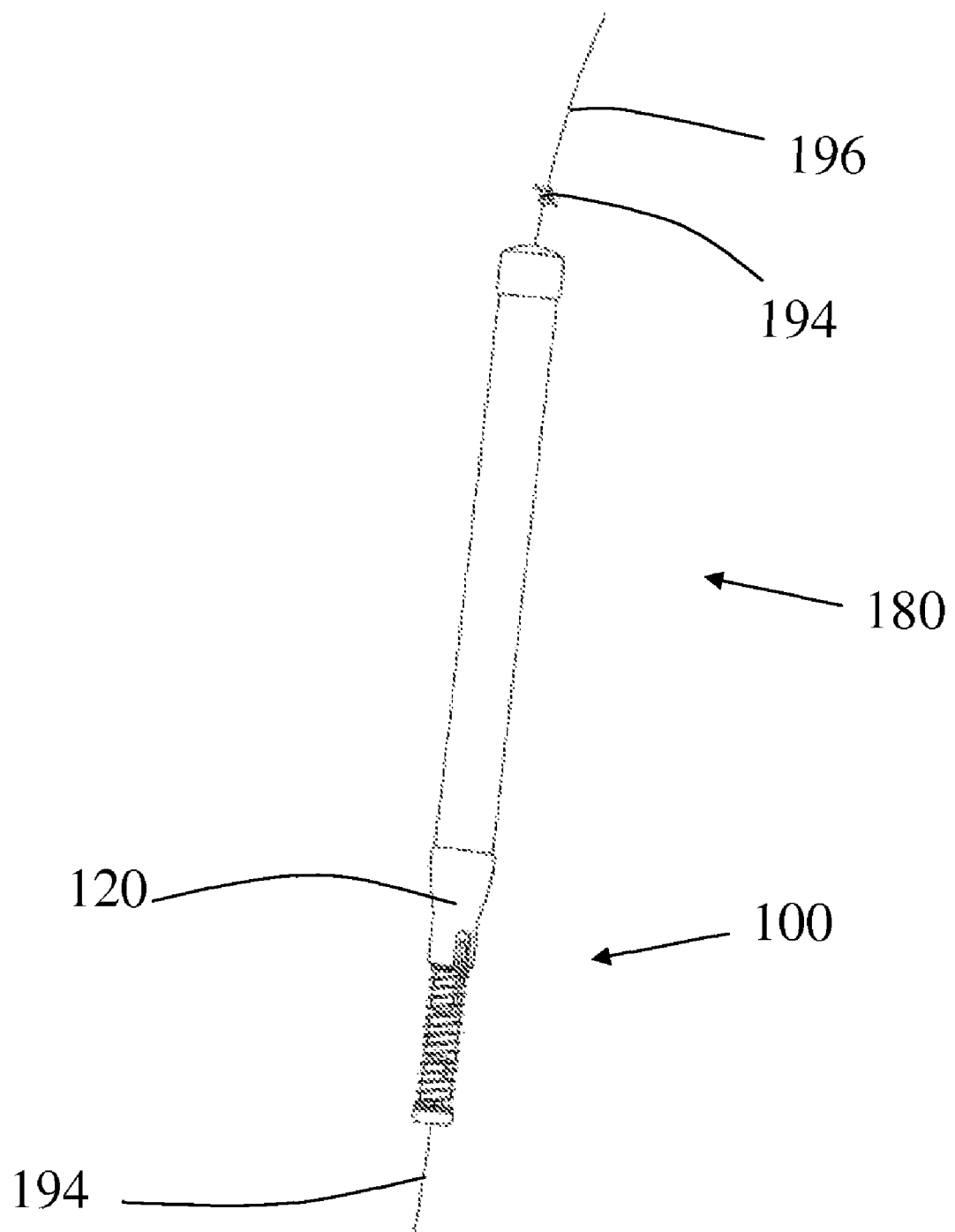
FIG. 22 is a front view of the multi-season stem guide of FIG. 19 configured for summer slip bobber fishing.

The use of the slip bobber configuration illustrated in FIG. 21 for winter fishing can be contrasted against the slip bobber configuration illustrated in FIG. 22 for summer fishing. In FIG. 22, the fishing line passes through the inner channels 110 and 185. When the user casts the fishing bobber rig 180, the fishing bobber rig can slide along the line 194. For example to cast, the user reels in the fishing line until the hook or other fishing apparatus at the end of the line is adjacent to the bobber rig 180. As illustrated in FIG. 22, the knot 196 is tied onto the fishing line 194. The knot 196 is of a size small enough to be reeled in and through the eyelets on the fishing rod (not shown) but large enough such that the knot will not enter and pass through the channels 110 and 185.

Upon casting out, the hook, weights or other gear attached to the end of the fishing line 194 will sink into the water while the buoyancy of the fishing bobber 180 keeps it floating on the surface. The fishing line 194 will continue to pass through the channels 110 and 180 until the knot 196 reaches the top of the bobber. Like the winter bobber configuration illustrated in FIG. 21, certain portions of the fishing bobber 180 will be above the water line and other portions below the water line. Unlike winter fishing, in summer fishing there is no concern that the water on the fishing line will freeze to the bobber. If the configuration in FIG. 22 was to be used in winter fishing where the temperature is below freezing, the water on the line 194 would cause the line to freeze to the bobber at least along the top of the bobber because the top of the bobber would be exposed to the sub-freezing temperatures.

As can be expected the stem guide 100 can be used to attach to fishing tackle other than a bobber. For example, the fishing tackle can be a light stick or a scent stick. The bobber, light stick or scent stick can be attached to the stem guide 100 according to any of the methods described above, such as one or more of a friction fit, a twist lock attachment, or an adhesive.

Similarly, the stem guide 100 can be an integral part of any piece of fishing tackle. The stem guide can be formed such that the stem cup or connector is a portion of the bobber or float and a further stem extends from the opposite end of the bobber or float. The stem guide 100 can be manufactured such that a foam float portion of a bobber is slid along the elongated stem adjacent to the line shoulders. In other words, the stem guide 100 can be a separate piece that is an after market attachment to an article of fishing tackle or it can be configured as an integral part of an article of fishing tackle.

Figure 23:
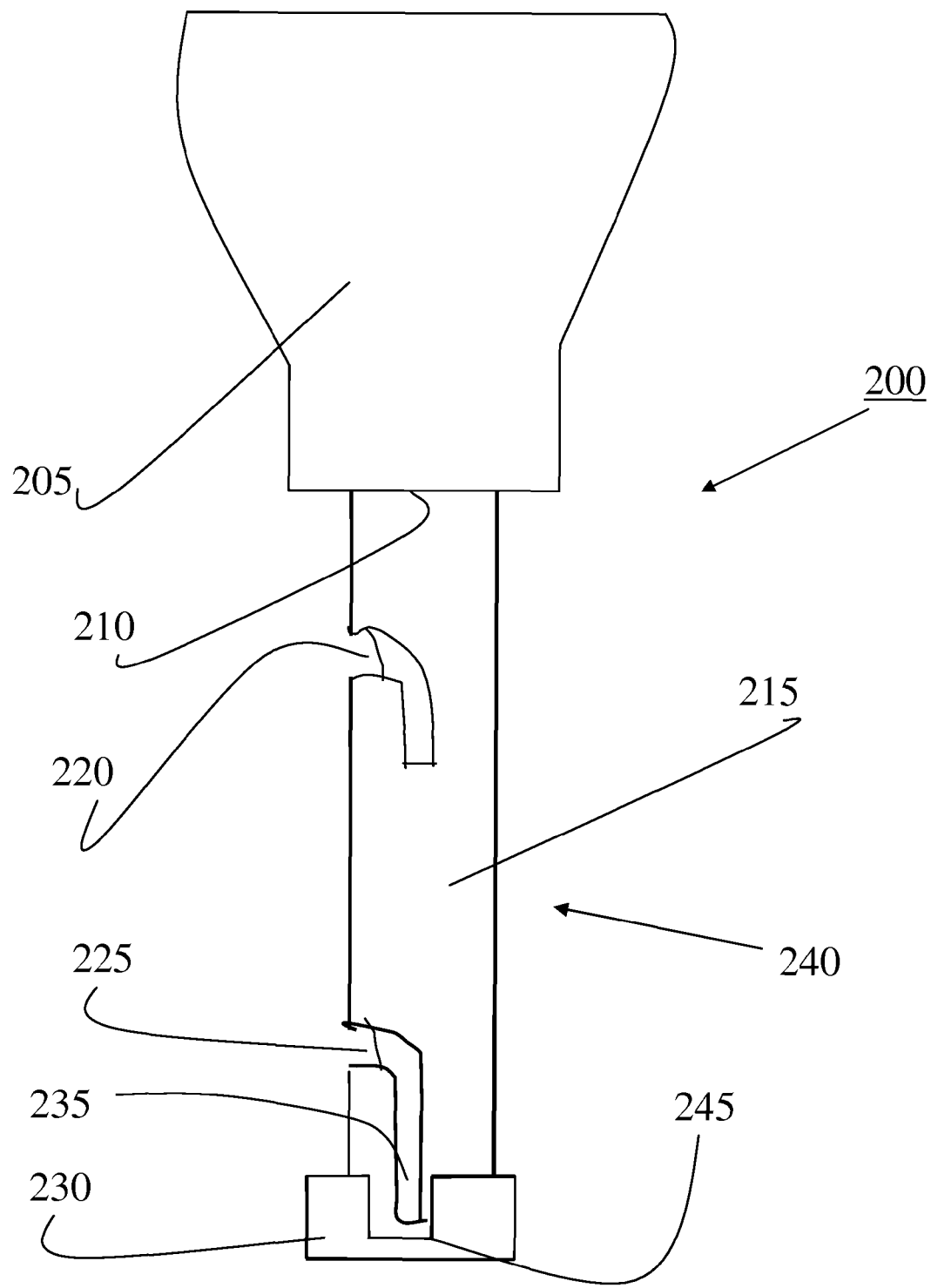
FIG. 23 is a front view of a second implementation of a multi-season stem guide.

The principle of the multi-season stem guide 100, namely the ability to slip bobber fish and fixed bobber fish in any season using one bobber, can be applied in other configurations of a stem guide as well. For example, referring to FIG. 23, a multi-season stem guide 200 includes an elongated rod 215 having a stem connector 205 on one end and a line stop system 240 on the other end. The line stop system 240 includes a flanged or annular sleeve stop 230 on one end and the stem connector 205 on the opposite end. A sleeve (not shown) is in compression between the annular sleeve stop 230 and a base 210 of the stem connector 205. As described above, the sleeve may be a spring or other compression means. The line stop system 240 further includes an upper L shaped line shoulder 220 and a lower L-shaped line shoulder 225. Each of the line shoulders are used to engage a fishing line that is inserted there through. The annular sleeve stop 230 includes a notched or cut-out section 245 into which an extension 235 of the lower line shoulder 225 is positioned.

The stem guide 200 is used similarly to the stem guide 100 except that the upper shoulder 220 is used for fixed bobber fishing and the lower shoulder 225 is used for winter slip bobber fishing. Upon pulling the sleeve (not shown) down so that it is compressed against the sleeve stop 230, the shoulder 220 is exposed and a fishing line can be placed within the shoulder. When the sleeve is released, the fishing line will enter and exit a space between the sleeve and the rod 215 adjacent to the base 210 of the stem connector 205. The fishing line will be fixed in position between the sleeve and the rod 215.

In contrast, for winter slip bobber fishing, the sleeve is pulled up so that is compressed against the stem connector base 210 with the lower shoulder 225 exposed so that a fishing line can be placed within the shoulder. When the sleeve is released, the fishing line will be pushed down within the shoulder extension 235 and surrounded by the notched section 245. Because the sleeve cannot extend all the way to the bottom of the extension 235, the fishing line can easily pass through the shoulder during winter slip bobber fishing. Of importance to winter fishing, when the bobber is in the water, the fishing line will be positioned in or under the water so that it will not freeze against the bobber.

Figure 24:
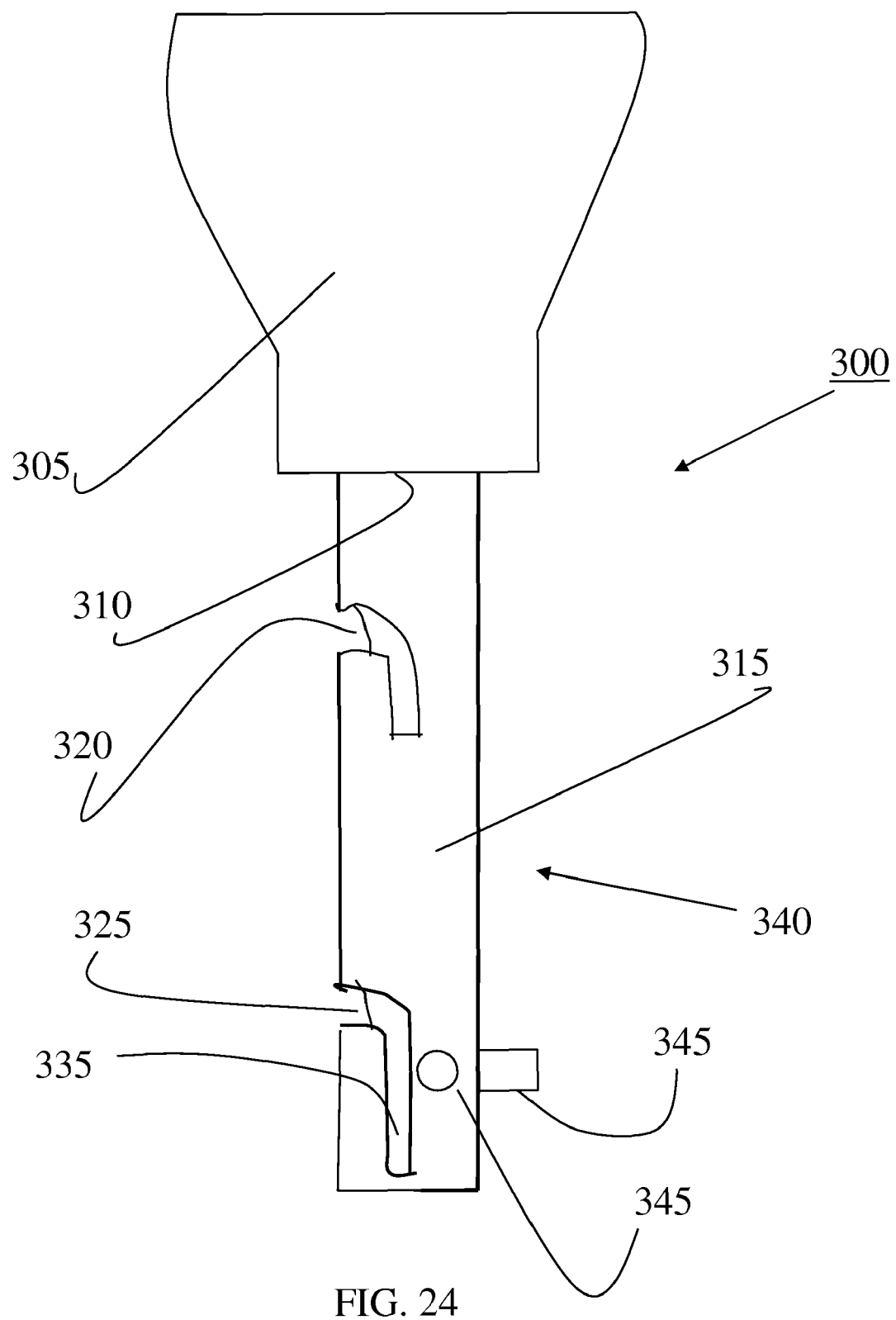
FIG. 24 is a front view of a third implementation of a multi-season stem guide.

In another implementation of a multi-season stem guide, FIG. 24 illustrates a multi-season stem guide 300 that includes an elongated rod 315 having a stem connector 305 on one end and a line stop system 340 on the other end. The line stop system 340 includes one or more sleeve stops 345 in the proximity of one end and the stem connector 305 on the opposite end. A sleeve (not shown) is in compression between the sleeve stops 345 and a base 310 of the stem connector 305. The line stop system 340 further includes an upper L shaped line shoulder 320 and a lower L-shaped line shoulder 325. Each of the line shoulders are used to engage a fishing line that is inserted there through. The sleeve stops 345 are positioned adjacent to the lower line shoulder 325 such that a portion 335 of the lower line shoulder 325 extends past the sleeve stops 345. In this manner, a sleeve around the rod 315 will not be able to extend past the sleeve stops 345.

The stem guide 300 is used similarly to the stem guide 200 with the upper shoulder 320 used for fixed bobber fishing and the lower shoulder 325 used for winter slip bobber fishing. Upon pulling the sleeve (not shown) down so that it is compressed against the sleeve stops 345, the shoulder 320 is exposed and a fishing line can be placed within the shoulder. When the sleeve is released, the fishing line will enter and exit a space between the sleeve and the rod 315 adjacent to the base 310 of the stem connector 305. The fishing line will be fixed in position between the sleeve and the rod 315.

In contrast, for winter slip bobber fishing, the sleeve is pulled up so that is compressed against the stem connector base 310 with the lower shoulder 325 exposed so that a fishing line can be placed within the shoulder. When the sleeve is released, the fishing line will pushed down within the shoulder extension 335 beyond the sleeve stops 345. Because the sleeve cannot extend all the way to the bottom of the extension 335, the fishing line can easily pass through the shoulder during winter slip bobber fishing. Of importance to winter fishing, when the bobber is in the water, the fishing line will be positioned in or under the water so that it will not freeze against the bobber.

Figure 25:
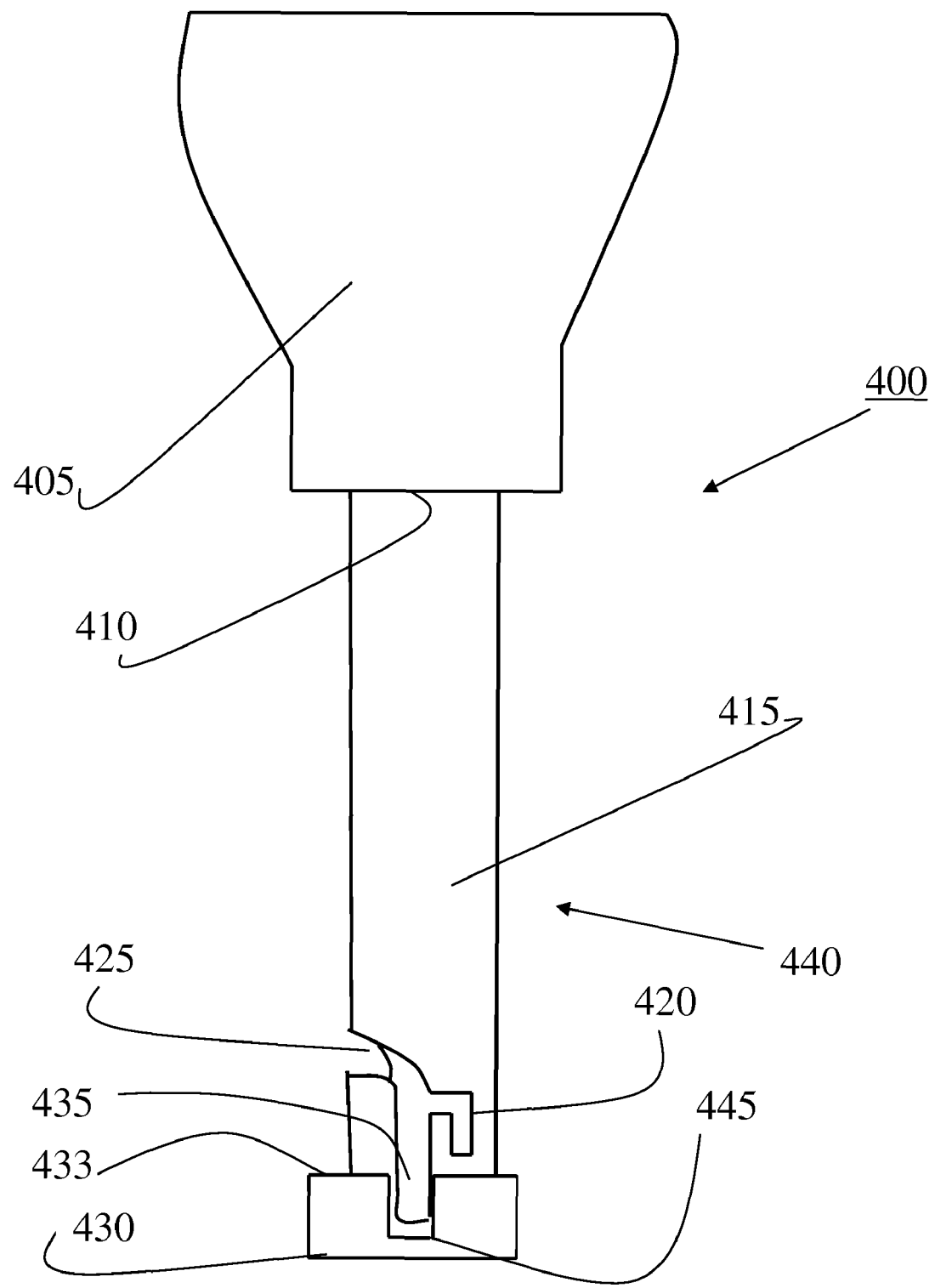
FIG. 25 is a front view of a fourth implementation of a multi-season stem guide.

In another implementation of a multi-season stem guide, FIG. 25 illustrates a multi-season stem guide 400 that includes an elongated rod 415 having a stem connector 405 on one end and a line stop system 440 on the other end. The line stop system 440 includes a sleeve stop 430 at one end and the stem connector 405 on the opposite end. A sleeve (not shown) is in compression between the annular sleeve stop 430 and a base 410 of the stem connector 405. The line stop system 440 further includes an L shaped line shoulder 425 that includes an upper portion 420 and a lower portion 435. Each of the line shoulder portions are used to engage a fishing line that is inserted through the shoulder 425. The upper portion 420 extends to the proximity of, but above, a top edge 433 of the sleeve stop 430. The lower portion 435 extends into a notched or cut-out section 445 of the annular sleeve stop 430. In this manner, a sleeve, such as a spring or other compression means, positioned around the rod 415 will extend past and enclose the upper portion 420 but will not be able to extend over the lower portion 430.

The stem guide 400 is used similarly to the above stem guides except that the shoulder 425 is used for both fixed bobber fishing and winter slip bobber fishing. In particular, the fishing line is fed into the line shoulder 425 and then into the upper portion 420 used for fixed bobber fishing and the lower portion 435 for winter slip bobber fishing. Upon pulling the sleeve (not shown) up so that it is compressed against the stem connector base 410, the shoulder 425 is exposed and a fishing line can be placed within the shoulder. The fishing line then can be placed within the upper extension 420 for fixed bobber fishing or the lower extension 435 for winter slip bobber fishing. For fixed bobber fishing, when the sleeve is released, the fishing line will enter and exit a space between the sleeve and the rod 415 adjacent to the top edge 433 of the sleeve stop 430. The fishing line will be fixed in position between the sleeve and the rod 415.

In contrast, for winter slip bobber fishing, when the sleeve is released the fishing line will be pushed down within the lower extension 435 in the notched section 445. Because the sleeve cannot extend all the way to the bottom of the lower extension 435, the fishing line can easily pass through the shoulder extension during winter slip bobber fishing. Of importance to winter slip bobber fishing, when the bobber is in the water, the fishing line will be positioned in or under the water so that it will not freeze against the bobber.

Figure 26:
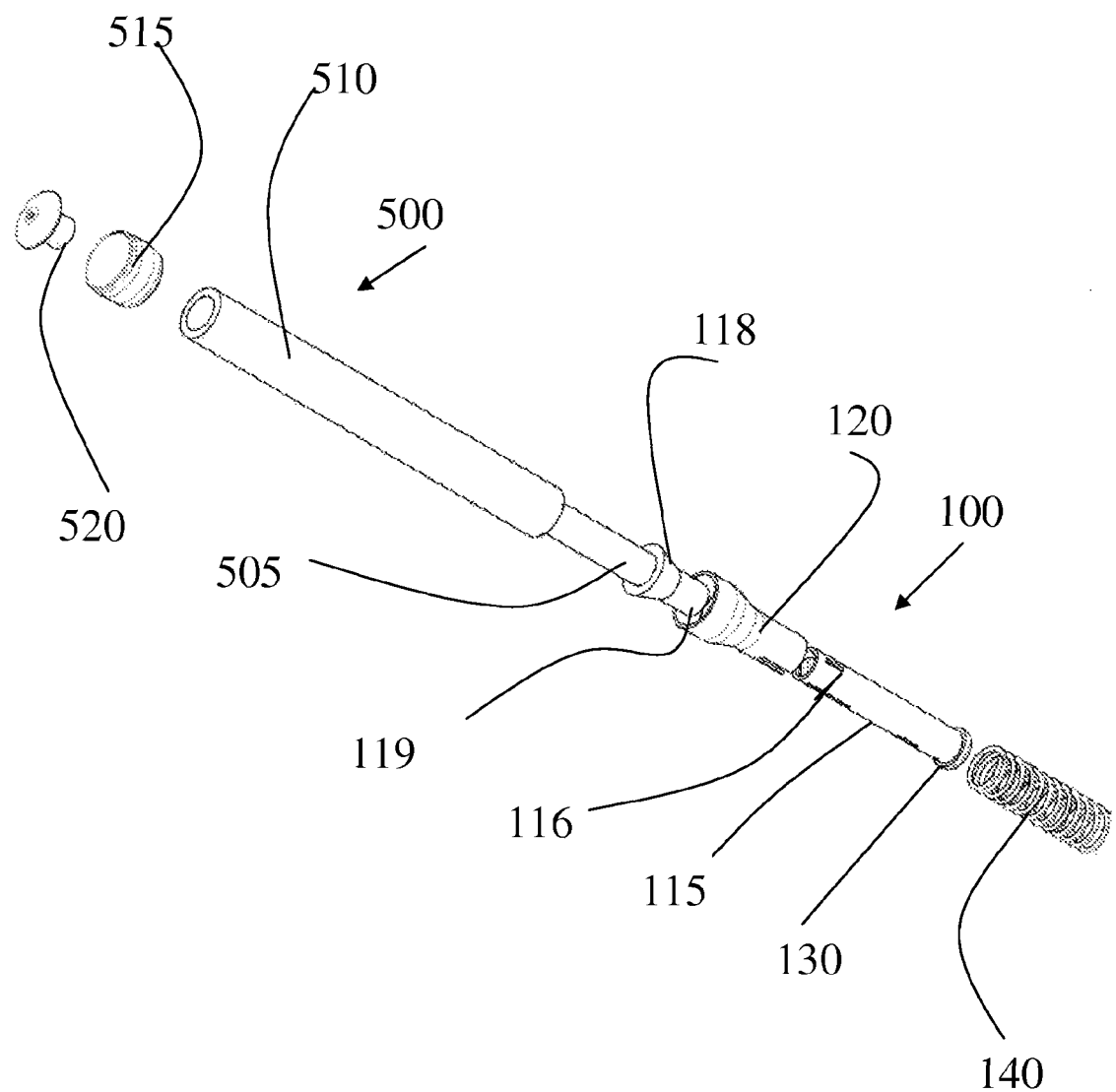
FIG. 26 is an exploded assembly view of a multi-season stem guide and stick bobber.
Figure 27:
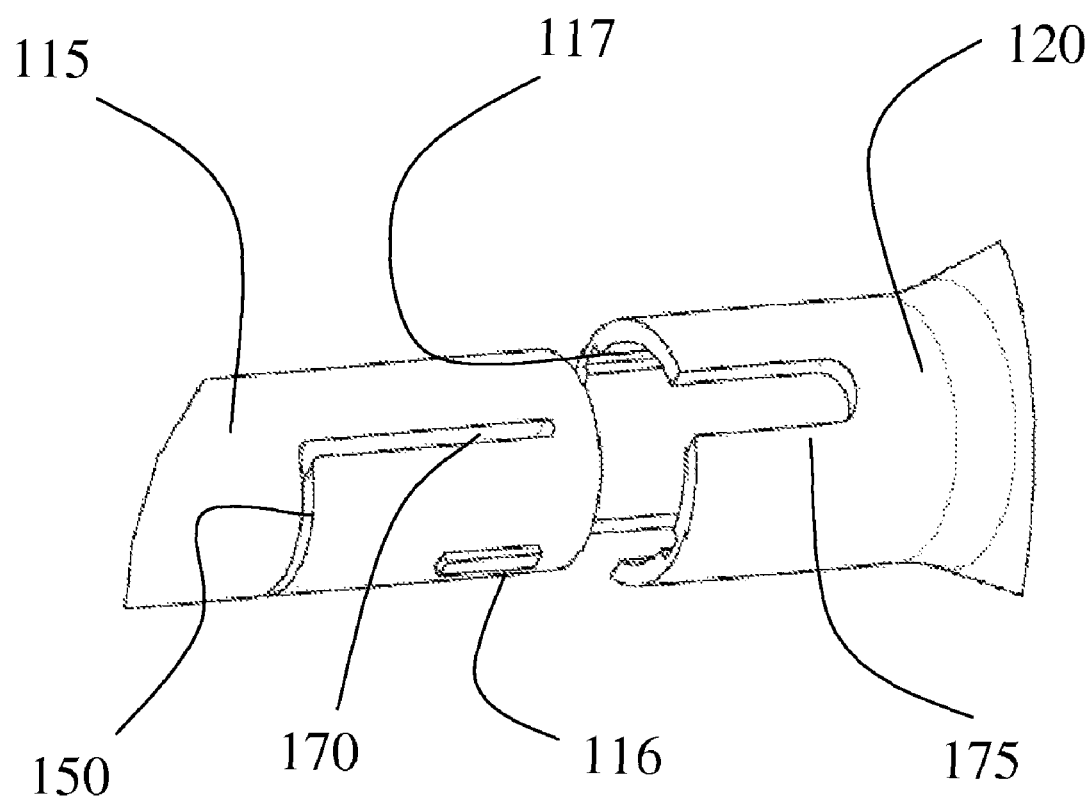
FIGS. 27 and 28 are perspective and front views respectively, showing the alignment of the stem cup to the elongated rod.
Figure 28:
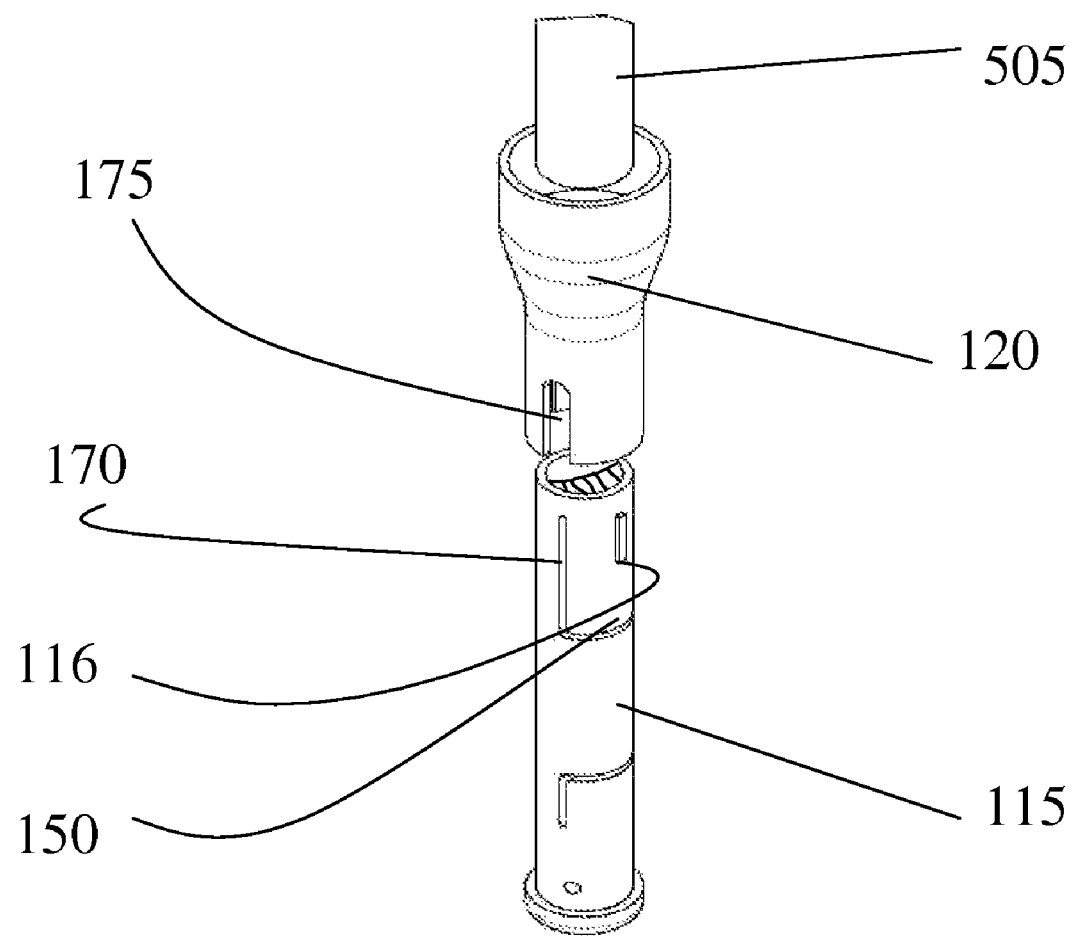
Figure 29:
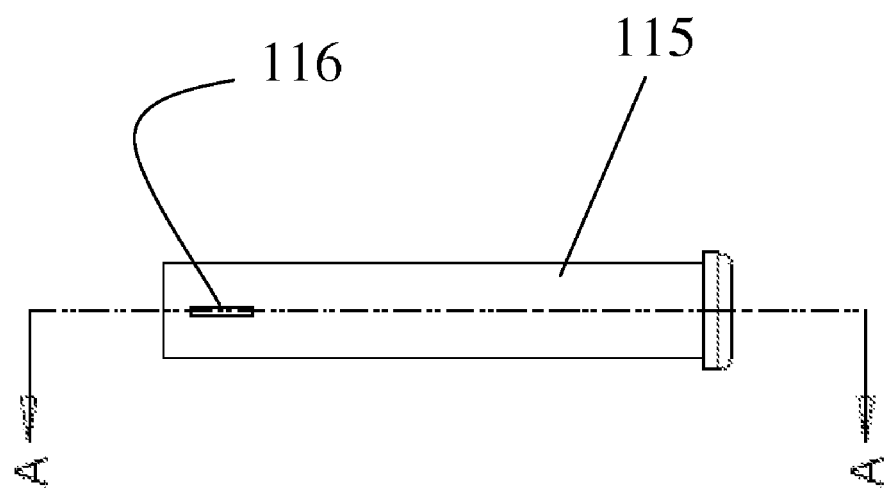
FIG. 29 is a side view of the elongated rod.
Figure 30:
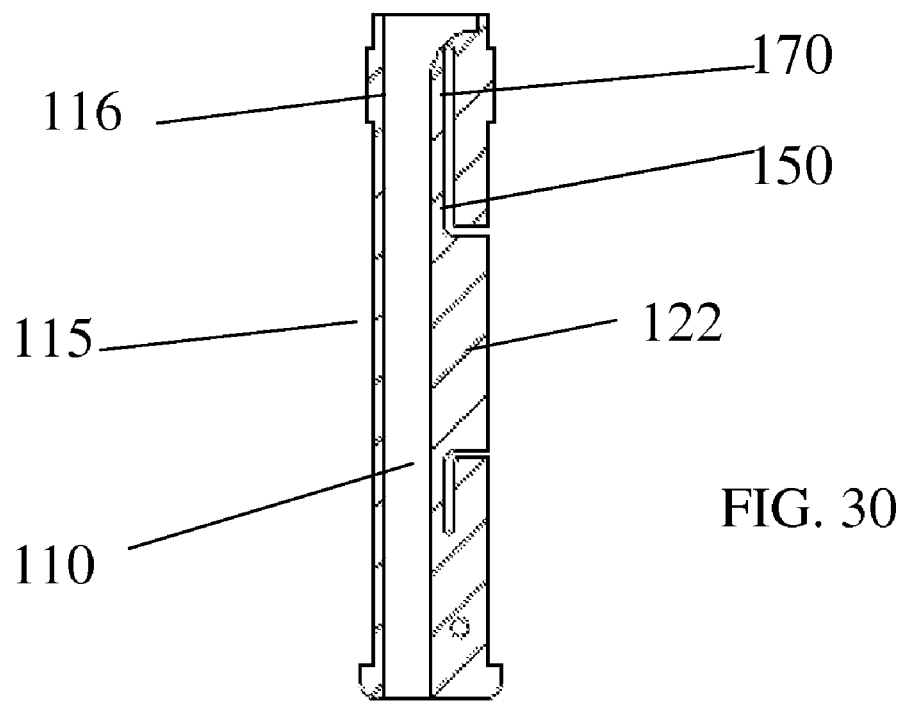
FIG. 30 is a cross-sectional side view of the elongated rod of FIG. 29 taken along section lines AA.
Figure 31:
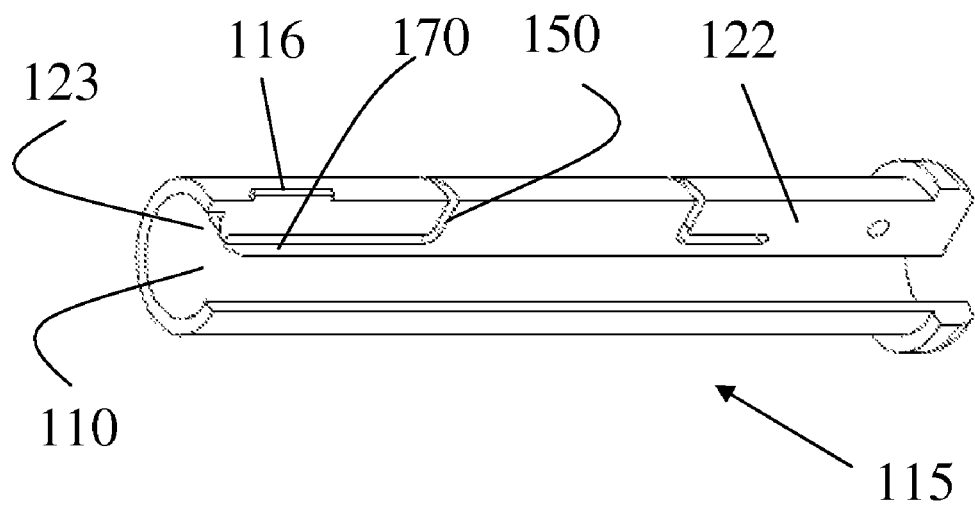
FIG. 31 is a perspective, cut away side view of the elongated rod of FIG. 29.
Figure 32:
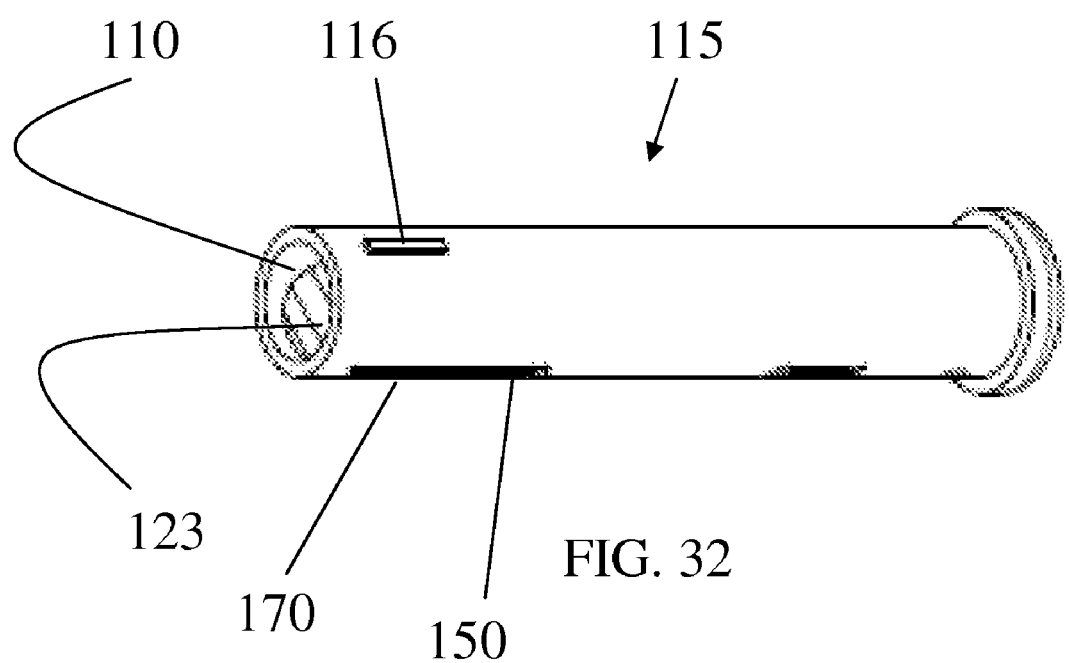
FIG. 32 is a perspective side view of the elongated rod of FIG. 29 showing the increase in channel diameter.

The assembly of one implementation of the stem guide 100 is illustrated in FIGS. 26-28. FIG. 26 is an expanded view of the stem guide 100 and a stick bobber 500, such as a stem of a stick bobber, that illustrates the arrangement of the components of both the stem guide and the stem. Referring also to FIGS. 27 and 28, the elongated rod 115 includes one or more alignment ridges 116 on its outside surface that are configured to mate within alignment grooves or slots 117 within the inner surface of the stem cup 120. In this manner, it is ensured that during assembly the extension 170 of the shoulder 150 and extension 170 will be properly aligned with the cutout section 175 of the stem cup. This is important to the reliable and consistent manufacture of the product because if the extension 170 of the shoulder and the cutout section 175 are not aligned, the stem guide may not function appropriately for slip bobber fishing.

Prior to mating the elongated rod 115 with the stem connector/cup 120, the sleeve 140 is placed over the rod. If not placed over the rod prior to assembly, the flange or stop 130 would prevent the sleeve from sliding onto the rod. The rod and stem connector or cup can be adhered together using an adhesive or other adhering means, e.g., heat, interference fit, etc. Once the rod, stem connector and sleeve are assembled, an optional weight 118 may be inserted into the open end 119 of the stem cup and adhered in position. Alternatively, another attachment method may be used to retain the weight within the stem cup. The weight 118 is useful when casting out with a fishing apparatus using the stem guide 100.

The assembled stem guide then may be combined with another piece of fishing tackle, such as the stick bobber 500. As illustrated in FIG. 26, the stick bobber 500 includes a stem 505, a float 510, a marker 515 and a grommet 520. The stem 505 has a longitudinal channel that is aligned with the channel 110 passing through the elongated rod so that a fishing line can be inserted into the elongated rod and passed into and through the longitudinal channel in the stem. The float 510 includes an internal longitudinal channel that receives the stem 505, and the two are held together using an adhesive, an interference fit, or other mating method known in the art. The marker 515 and grommet 520 are mounted to the other end of the stem and the grommet mounted to the longitudinal channel in the float with an adhesive, interference fit, etc. or combination.

FIGS. 29-32 show in more detail the configuration of the elongated rod that forms the stem of the stem guide. As noted above, the elongated rod includes the internal longitudinal channel 110 that runs the length of the rod from a first open end to a second open end. The body of the elongated rod therefore can be divided between the channel and the remainder of the body, which is a solid portion 122. The diameter of the channel 110 is sufficiently large such that it can receive a fishing line and have a negligible affect on the ability of the line to pass through the channel, such as during casting or reeling in the line. The shoulders are molded and positioned entirely or at least primarily within the solid portion 122 of the rod. This manufacturing process causes the shoulders to be smooth, radiused or rounded so they can cause minimal damage to the fishing line inserted within the channel 110. In addition, because of the large percentage of the rod that is the solid portion 122, the strength of the rod is increased in comparison to a similar extruded tube with a larger diameter channel.

Also of note in the configuration of the elongated rod 115 is the widened end 123 of the channel 110 which is positioned within the stem cup. The channel diameter at that end 123 increases such that the fishing line passing through the rod 115 will more easily pass into the channel in the stem of the attached stick bobber, light stick, scent stick, etc. The channel opening at the opposite end of the rod also may have an increased diameter relative to the majority of the length of the channel, such as by having a flared opening. In this manner, the angler can easily insert the line into the stem guide.

Figure 34:
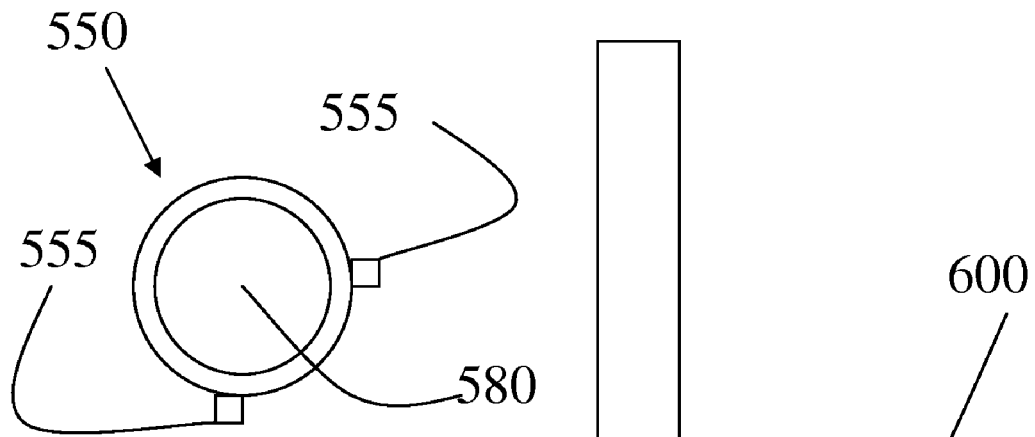
FIG. 34 is a top view of the stem guide of FIG. 33.
Figure 33:
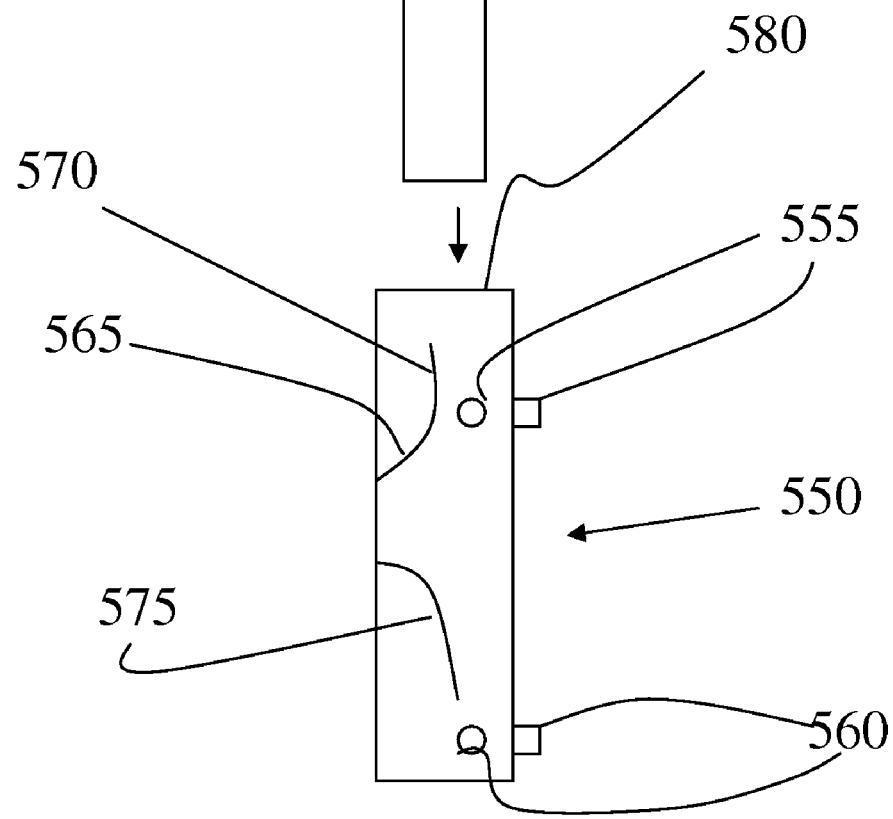
FIG. 33 is a front view of a stem guide and a fishing article for inserting into an open end of the stem guide.

Referring to FIGS. 33 and 34, in another configuration a stem guide consists of an elongated rod 550 that has a pair of line shoulders 565 and 575 and multiple line stops 555 and 560. A movable sleeve (not shown), such as a spring, is positioned between the line stops 555 and 560. Generally, the sleeve will be maintained in compression between the line stops 555 and 560. The line stops are arranged relative to the line shoulders to permit fixed fishing and winter slip bobber fishing. The line shoulder 575 is positioned entirely between the line stops 555 and 560. In this manner, a fishing line positioned in the line shoulder 575 would be compressed by the sleeve against a surface of the elongated rod 550 such that the fishing line cannot move or slide through the line shoulder 575 and thereby functions for fixed bobber fishing. In contrast, the line shoulder 565 has an extension 570 that extends along the length of rod but on the opposition side of the line stop 555 relative to the shoulder 565. Because of this configuration, the sleeve cannot extend beyond the stops 555 and 560 and would not slide over the extension 570. In this manner a fishing line positioned within the line shoulder 565 would be advanced by the sleeve into the extension 570 such that the fishing line can move or slide within the extension 570 and function for winter slip bobber fishing.

The elongated rod 550 also has a lumen 580 along its length to permit summer slip bobber fishing. The lumen is oversized for purposes of carrying a fishing line but because of its diameter a fishing article, such as a light stick, scent stick or bobber stem 600, or part thereof, can be press fit or adhered within the lumen. With this configuration, the elongated rod also functions as a stem guide, but without the need to add a second part, i.e., the stem cup, and the elongated rod can be extruded or molded. If the rod is extruded, the line shoulders can be cut into the rod and then radiused or smoothed. The line stops can be mounted using conventional means. Alternatively, if the rod is molded, the line stops and line shoulders can be molded at the same time. The injection molded rod also can be molded such that the line stops are configured to be flanges or ridges around all or part of the outer circumference of the rod. In either method, the sleeve can be placed over the line stops and be maintained in compression between the line stops.

To use the stem guide for fixed bobber fishing, the angler compresses the sleeve up to expose the line shoulder 575 and passes the fishing line into the line shoulder. The angler then releases the sleeve to fix the position of the fishing line in the shoulder 575. To use the stem guide for winter slip bobber fishing, the angler compresses the sleeve down to expose the line shoulder 565 and passes the fishing line into the line shoulder. The angler then releases the sleeve to allow the fishing line to be forced into extension 570. Before or after the position of the fishing line in the line shoulder is set, the angler can attach a fishing article to the stem guide by inserting the article into the open end of the lumen. An adhesive may be used if desired. If the angler wishes to use the stem guide for summer slip bobber fishing, the fishing article should first be inserted into the stem guide and then the fishing line passed through the lumen in the fishing article and the lumen of the stem guide.

While several particular forms of the invention have been illustrated and described, it will be apparent that various modifications can be made without departing from the spirit and scope of the invention. For example, it is expected that the elongated rod can be extruded and the line shoulders formed within the rod such that the edges are smoothed or radiused. The stem cup then can be mounted to the rod if necessary. Also, the elongated rod and stem cup can be molded as either a single piece or two separate pieces that later are joined. The stem guide may be an integral part of a piece of fishing tackle, such as a bobber, light stick or scent stick. Similarly, references to materials of construction, specific dimensions, and utilities or applications are also not intended to be limiting in any manner and other materials and dimensions could be substituted and remain within the spirit and scope of the invention. Accordingly, it is not intended that the invention be limited, except as by the appended claims.

The invention claimed is:

1. A fishing tackle stem guide, the stem guide comprising:
an elongated rod having a first line shoulder therein for receiving a fishing line, the first line shoulder in the form of a slot extending from a first end at an outer surface of the elongated rod and terminating at a second end at a position within the elongated rod at a different longitudinal position along a length of the rod from a position of the first end, the slot both communicating with and extending between diametrically opposed openings in the rod to allow a fishing line to pass through the elongated rod within the slot and extending from the outer surface of the elongated rod to within the elongated rod;
a movable sleeve positioned around the elongated rod and configured to move in a lengthwise direction of the elongated rod;
at least one sleeve stop to limit the movement of the sleeve in the lengthwise direction of the elongated rod;
a stem connector located on a first end of the elongated rod; and
a line stop system comprising the movable sleeve being positionable at a second end of the elongated rod to contact the fishing line for fixing a first position of the fishing line in a second line shoulder relative to the elongated rod to enable the fishing line to be restrained from sliding along a longitudinal axis of the fishing line through the second line shoulder and the movable sleeve being positionable in a second position of the fishing line for positioning the fishing line in the first line shoulder to enable the fishing line to be slidable along the longitudinal axis of the fishing line through the first line shoulder, the second line shoulder being defined by a slot having a first end at the outer surface of the elongated rod and terminating at a second end at a position within the elongated rod at a different longitudinal position along the length of the rod from a position of the first end of the second line shoulder slot, wherein the terminating second end of the slot of the first line shoulder is at a different position in the elongated rod than the terminating second end of the second line shoulder, wherein the first line shoulder slot extends along the longitudinal axis of the elongated rod and the at least one sleeve stop is positioned such that the movement of the movable sleeve is limited in a manner that limits the lengthwise movement of the movable sleeve over an entirety of the first line shoulder, wherein a first portion of the slot of the first line shoulder is on one side of the at least one sleeve stop and is in communication with a second portion of the first line shoulder slot extending along the length of the elongated rod beyond the at least one sleeve stop to an other side of the at least one sleeve stop opposing the one side whereby the second portion of the first line shoulder slot remains uncovered by the movable sleeve in any position of the movable sleeve, and wherein the first end of the slot of the first shoulder is located between the first and second ends of the elongated rod.

2. The fishing tackle stem guide of claim 1 wherein the sleeve comprises a compressible spring.

3. The fishing tackle stem guide of claim 1 wherein the sleeve is compressed up for one of fixing of the first position of the fishing line and fixing of the second position of the fishing line and compressed down for the other of fixing of the first position of the fishing line and fixing of the second position of the fishing line.

4. The fishing tackle stem guide of claim 1 wherein the sleeve is compressed either up or down for both of fixing the first position of the fishing line and fixing the second position of the fishing line.

5. The fishing tackle stem guide of claim 1 wherein the first line shoulder and the second line shoulder extend from a single line shoulder.

6. The fishing tackle stem guide of claim 1 wherein the first line shoulder and the second line shoulder are different line shoulders.

7. The fishing tackle stem guide of claim 1 wherein the elongated rod further comprises a flange encircling at least a portion of the elongated rod and the at least one sleeve stop comprises a surface on the flange against which the sleeve expands in the lengthwise direction of the elongated rod and the surface includes a notched or cut-out portion extending in the lengthwise direction of the elongated rod, the first line shoulder including a portion being positioned within the notched or cut-out portion, whereby for fixing of the first position of the fishing line the fishing line is within the second line shoulder and the sleeve compresses the fishing line against the surface of the at least one sleeve stop to prevent movement of the fishing line through the second line shoulder and for fixing of the second position of the fishing line the fishing line is within the first line shoulder without being under compression by the sleeve such that the fishing line is movable through the first line shoulder.

8. The fishing tackle stem guide of claim 7 wherein the first line shoulder and the second line shoulder are the same.

9. The fishing tackle stem guide of claim 7 wherein the first line shoulder and the second line shoulder are not the same.

10. The fishing tackle stem guide of claim 1 wherein the elongated rod further comprises the at least one sleeve stop comprising at least one extension extending outwardly from the elongated rod that limits lengthwise expansion of the sleeve in a first direction along the elongated rod, the at least one sleeve stop further comprising the stem connector which includes a surface that limits lengthwise expansion of the sleeve in a second opposite direction along the elongated rod and the first line shoulder is positioned such that the second portion of the first line shoulder extends beyond the extension in the first direction of expansion of the sleeve, whereby for fixing the first position of the fishing line the fishing line is within the second line shoulder and the sleeve compresses the fishing line against the surface of the stem connector to prevent movement of the fishing line through the second shoulder and for fixing the second position of the fishing line the fishing line is within the first line shoulder without being under compression by the sleeve such that the fishing line is movable through the first line shoulder.

11. The fishing tackle stem guide of claim 1 wherein the elongated rod includes an axial opening therethrough.

12. The fishing tackle stem guide of claim 1 wherein the elongated rod comprises a molded polymer with the first and second line shoulders molded therein to provide radiused line shoulders.

13. The fishing tackle stem guide of claim 1 including an extruded fishing float having a hollow stem with at least one end secured to the stem connector to enable a fishing line to extend through an axial opening in the elongated rod and the hollow fishing float stem to provide a slip bobber.

14. The fishing tackle stem guide of claim 1 including one or more of a light stick, a scent stick or a fishing float having a stem with at least one end secured to the stem connector.

15. The fishing tackle stem guide of claim 1, wherein the elongated rod has a channel running along at least a portion of the length of the elongated rod for receiving a fishing line.

16. The fishing tackle stem guide of claim 1, further comprising a foam fishing float with at least one end secured to the stem connector.

17. The fishing tackle stem guide of claim 16, wherein the foam fishing float is secured to the stem connector by a friction fit.

18. The fishing tackle stem guide of claim 16, wherein the foam fishing float secured to the stem connector by a friction fit can be removed and replaced with another fishing article.

19. The fishing tackle stem guide of claim 16, wherein the foam fishing float is secured to the stem connector by an adhesive.

20. A fishing tackle stem guide, the stem guide comprising:
an elongated rod having a channel running along at least a portion of a length of the elongated rod for receiving a fishing line and a first line shoulder therein for receiving a fishing line, the first line shoulder extending from a first end at an outer surface of the elongated rod and terminating at a second end within the elongated rod;
at least one sleeve stop to limit movement of a sleeve in a lengthwise direction of the elongated rod;
a stem connector located on a first end of the elongated rod; and
a line stop system comprising a movable sleeve positioned on the elongated rod and being located on a second end of the elongated rod for fixing a position of the fishing line in a second line shoulder relative to the elongated rod in a first position to enable the fishing line to be restrained from sliding along the second line shoulder and for positioning the fishing line in the first line shoulder in a second position to enable the fishing line to be slidable along the first line shoulder, the second line shoulder extending from a first end at the outer surface of the elongated rod and terminating at a second end at a position within the elongated rod at a different longitudinal position along the length of the elongated rod from a position of the first end of the second line shoulder, wherein the second terminating end of the first line shoulder is at a different position in the elongated rod than the second terminating end of the second line shoulder, wherein the at least one sleeve stop is positioned between the first position and the second position to prevent the movable sleeve from sliding over an entirety of the first line shoulder in the second position, wherein the at least one sleeve stop comprises a surface on the stem connector against which the sleeve expands in the lengthwise direction of the elongated rod, and the surface includes a notched or cut-out portion extending in the lengthwise direction of the elongated rod, the first line shoulder being positioned at least in part within the notched or cut-out portion, whereby in a fixed bobber position the fishing line is within the second line shoulder and the sleeve compresses the fishing line against the at least one sleeve stop to prevent movement of the fishing line through the second shoulder and in a slip bobber position the fishing line is within the first line shoulder without being under compression by the sleeve such that the fishing line is movable through the first line shoulder, wherein a first portion of the first line shoulder is on one side of the at least one sleeve stop and is in communication with a second portion of the first line shoulder extending along the length of the elongated rod beyond the at least one sleeve stop to an other side of the at least one sleeve stop opposing the one side whereby the second portion of the first line shoulder remains uncovered by the movable sleeve in any position of the movable sleeve, and wherein the first end of the first shoulder is located between the first and second ends of the elongated rod.

21. The fishing tackle stem guide of claom 20, wherein the notched or cut-out portion extends into the stem connector.

22. The fishing tackle stem guide of claim 20, further comprising a foam fishing float with at least one end secured to the stem connector.

23. The fishing tackle stem guide of claim 22, wherein the foam fishing float is secured to the stem connector by a friction fit.

24. The fishing tackle stem guide of claim 22, wherein the foam fishing float secured to the stem connector by a friction fit can be removed and replaced with another fishing article.

25. The fishing tackle stem guide of claim 22, wherein the foam fishing float is secured to the stem connector by an adhesive.

* * * * *